United States Patent [19]

Martin et al.

[11] Patent Number: 5,819,015
[45] Date of Patent: Oct. 6, 1998

[54] METHOD AND APPARATUS FOR PROVIDING REMOTE PRINTER RESOURCE MANAGEMENT

[75] Inventors: Jay Scott Martin; Martin Geoffrey Rivers; Christopher Mark Songer; Gail Marie Songer; James Francis Webb; Jeffrey Keith Wedinger, all of Lexington, Ky.

[73] Assignee: Lexmark International, Inc., Lexington, Ky.

[21] Appl. No.: 948,983

[22] Filed: Oct. 10, 1997

Related U.S. Application Data

[62] Division of Ser. No. 636,207, Apr. 22, 1996, Pat. No. 5,720,015.

[51] Int. Cl.$^6$ .................................................. G06F 15/00
[52] U.S. Cl. .......................... 395/114; 395/112; 395/115
[58] Field of Search .................................. 395/114, 115, 395/116, 113, 112, 110, 101, 117, 200.35, 200.47, 200.48, 200.49, 200.53, 200.56, 200.59, 828, 835, 836, 837, 838, 839, 840, 858, 856, 821, 182.04; 358/468, 407, 404, 444, 403, 442; 364/282.1, 282.4, 285, 285.1; 345/508, 511, 356

[56] References Cited

U.S. PATENT DOCUMENTS

| 5,075,875 | 12/1991 | Love et al. ............................. | 395/117 |
| 5,084,875 | 1/1992 | Weinberger et al. .................... | 371/291 |

(List continued on next page.)

FOREIGN PATENT DOCUMENTS

| 0575 168 A1 | 12/1993 | European Pat. Off. .......... G06F 3/12 |

OTHER PUBLICATIONS

Network Printing Alliance Protocol, A Printer/Host Control Specification, Level 1, Revision N, Feb. 11, 1994, Developed By The Network Printing Alliance.

HP JetDirect Network Interface Configuration Guide, Hewlett–Packard Manual Part No. J2371–90001, 1993, pp. iv–ix and Section 2 Software Installation and Configuration for Novell Netware Networks, pp. 2–2 through 2–18.

HP JetDirect EX External Network Interface Configuration Guide, Hewlett–Packard Manual Part No. J2382–90101, 1993, pp. 7–12 and Section 2 Novell NetWare Networks, pp. 2–2 through 2–36.

(List continued on next page.)

*Primary Examiner*—Edward L. Coles
*Assistant Examiner*—Dov Popovici
*Attorney, Agent, or Firm*—John J. McArdle, Jr.

[57] ABSTRACT

An improved networked system having a host computer and multiple printers is provided in which the printers have a bi-directional data communications capability and have at least one memory device capable of storing print data and other types of data files. The host computer can be utilized by a user or a Network Administrator to "read" the contents of each memory device on each printer connected to the network that has the NPAP bi-directional communications capability. The user/Network Administrator can de-fragment data files (e.g., print job files) on a flash RAM memory device, or can format one of the memory devices of a printer (which deletes all of the files stored on that memory device). Furthermore, the user/Network Administrator can transfer a file from the memory of one of the printers on the network to the memory of a second of the printers on the network. When a given resource management function has been completed, an updated resource directory is automatically displayed at the host which includes all of the changes resulting from the earlier resource management function command. Once the printer receives an NPAP command of the type that accesses the resource management capabilities of the printer, the printer's Emulation Manager will control the execution of the resource management function that has been received. The Emulation Manager communicates the command along with the required arguments to the Common File System, which performs the actual data manipulation of any of the files in the memory devices.

8 Claims, 12 Drawing Sheets

U.S. PATENT DOCUMENTS

| | | | |
|---|---|---|---|
| 5,164,842 | 11/1992 | Gauronski et al. | 358/401 |
| 5,214,772 | 5/1993 | Weinberger et al. | 395/575 |
| 5,220,566 | 6/1993 | Ikenoue | 370/112 |
| 5,220,674 | 6/1993 | Morgan et al. | 395/800 |
| 5,226,112 | 7/1993 | Mensing et al. | 395/114 |
| 5,247,623 | 9/1993 | Sun | 395/325 |
| 5,271,065 | 12/1993 | Rourke et al. | 382/1 |
| 5,303,336 | 4/1994 | Kageyama et al. | 395/114 |
| 5,323,393 | 6/1994 | Barrett et al. | 370/85.8 |
| 5,333,286 | 7/1994 | Weinberger et al. | 395/575 |
| 5,353,388 | 10/1994 | Motoyama | 395/117 |
| 5,361,265 | 11/1994 | Weinberger et al. | 371/29.1 |
| 5,371,837 | 12/1994 | Kimber et al. | 395/114 |
| 5,438,528 | 8/1995 | Emerson et al. | 364/580 |
| 5,483,653 | 1/1996 | Furman | 395/114 |
| 5,550,957 | 8/1996 | Davidson, Jr. et al. | 395/114 |
| 5,559,933 | 9/1996 | Boswell | 395/114 |
| 5,636,333 | 6/1997 | Davidson, Jr. et al. | 395/114 |
| 5,651,114 | 7/1997 | Davidson, Jr. | 395/114 |
| 5,659,670 | 8/1997 | AuClair | 395/115 |

OTHER PUBLICATIONS

Lexmark WinWriter 600 User's Reference, Manual No. SA40–0779–00, 1993, Chapter 2 Using the Windows Printing System, pp. 11–26 and Chapter 3 Checking Print Status, pp. 27–39.

Common Printer Access Protocol (CPAP) Specification, Jun. 16, 1995, Digital Equipment Corporation.

Standard Signaling Method for a Bi–directional Parallel Peripheral Interface for Personal Computers, IEEE P 1284 D2.00, Sep. 10, 1993, Institute of Electrical and Electronic Engineers, pp. 1–119.

Frank Hayes; "The Printers Talk Back"; Dec. 1993; pp. 1–5.

Adobe PostScript; "PostScript™ Fax"; Aug. 1993; pp. 1–9.

METHOD AND APPARATUS FOR PROVIDING REMOTE PRINTER RESOURCE MANAGEMENT

This application is a division of application Ser. No. 08/636,207, filed Apr. 22, 1996, now U.S. Pat. No. 5,720,015.

TECHNICAL FIELD

The present invention relates generally to the use of multiple printers connected to a network and is particularly directed to a network containing at least one host computer. The invention is specifically disclosed as a method for managing from a host computer the information stored on a printer's various memory devices.

BACKGROUND OF THE INVENTION

Printers receive print data from a source, such as a single host computer, or from a network that contains at least one host computer or network server. One recent development with respect to laser printers is the addition of a "memory option," which is an internal memory device such as flash RAM (Random Access Memory) or a hard disk drive, in which each type of memory can store files containing print data.

Another recent development with respect to laser printers is the use of a network adapter that allows bi-directional communication with host computers over the network. Such bi-directional communication would typically be made using a protocol known as the Network Printer Alliance Protocol (NPAP) which provides a means for returning status information from a laser printer to a host computer. The NPAP and bi-directional capabilities and memory storage capabilities of such laser printers, particularly the Lexmark Model 4039 Plus™ and Model OPTRA™, manufactured by Lexmark International, Inc., are quite broad, and can be further enhanced by creating a function that allows a Network Administrator to easily control the memory resources of each printer on the network, and to transfer print data between such printers. Details of the published Network Printer Alliance Protocol are contained in the NPAP Specification Level 1, Revision N, dated Feb. 11, 1994. This NPAP Specification is incorporated herein by reference.

One conventional product that transfers a form of print data between printers is named "PostScript Fax," and is sold by Adobe Systems, located in Mountain View, Calif. This POSTSCRIPT FAX™ product uses a POSTSCRIPT™ printer to first convert a document into a POSTSCRIPT file, then convert the file into a fax image (which operates the same as converting the file into a print image). The POSTSCRIPT printer than transmits the fax image (typically over telephone lines) to a destination fax machine, which uses the same software to print the document. The document did not first need to be printed and then faxed, thereby saving the step of scanning the paper document into a sending fax machine.

The POSTSCRIPT FAX product does not store the data in a non-volatile memory at either the sending or receiving ends of the fax transmission. Therefore, reusable fonts or macros cannot be "saved" and stored in a printer that, otherwise, could be expected to be used in printing many documents that contain repeatable information. Furthermore, the receiving printer in the POSTSCRIPT FAX system operates of received data in the same order that the data is received (by that receiving printer), and, therefore, operates in a "synchronous" mode which cannot accept data at one input port while operating on (e.g., printing) data that was received (or is being received) at a second input port.

SUMMARY OF THE INVENTION

Accordingly, it is a primary object of the present invention to provide a networked system that includes a host computer and multiple printers in which the printers are capable of allowing the host computer to easily manage the memory devices of the printers connected to the network, via commands entered by a user or a Network Administrator working at the host computer.

It is a further object of the present invention to provide a networked system having a host computer and multiple printers in which the data files stored in a flash RAM memory can be de-fragmented so as to reclaim previously used space that would otherwise go unused.

It is yet another object of the present invention to provide a networked system having a host computer and multiple printers in which data files can be transferred from one printer's memory device to a second printer's memory device.

It is yet a further object of the present invention to provide a networked system having a host computer and multiple printers in which a memory device of a particular printer can be formatted, thereby deleting all of the data files stored on that particular memory device.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved networked system having a host computer and multiple printers is provided in which the printers have a bi-directional data communications capability and have at least one memory device capable of storing print data and other types of data files. Such printers preferably meet the standards of the Network Printer Alliance Protocol (NPAP) which defines industry standard for bi-directional communications between a host computer and a printer, either over a network or directly between such computer and printer. In the present invention, the host computer can be utilized by a user or a Network Administrator to "read" the contents of each memory device on each printer connected to the network that has the NPAP bi-directional communications capability, typically in the form of a directory.

The user/Network Administrator is able to copy a file from one memory device to another memory device within a single printer, move a data file from one memory device to another memory device within a single printer, and delete a data file from one of the memory devices of the printer. In addition, the user/Network Administrator can de-fragment the files on a flash RAM memory device (to optimize its use), or can format one of the memory devices of a printer (which deletes all of the files stored on that memory device). Furthermore, the user/Network Administrator can transfer a file from the memory of one of the printers on the network to the memory of a second of the printers on the network. When a given resource management function has been completed, an updated resource directory is automatically displayed at the host which includes all of the changes resulting from the earlier resource management function command.

After the host computer has "registered" for Lexmark extension alerts at a particular printer via NPAP, the Network Administrator or any user currently working at a host computer on the network can easily obtain a directory of the "resources" (i.e., files) stored at one of the printers in one of its memory devices. The information that is displayed at the host includes the type of memory device on which the file is stored, the size (in bytes) of the file, the identification or name of the file, the level of protection assigned to the file, and a description of the file. Further information is also available, such as the amount of available space remaining on each of the memory devices of the printer, and the type of protection assigned to each of the memory devices. The software used at the host computer is preferably compatible with Microsoft WINDOWS™.

Once the printer receives an NPAP command of the type that accesses the resource management capabilities of the printer, the printer's Emulation Manager will control the execution of the resource management function that has been received. The Emulation Manager communicates the command along with the required arguments to the Common File System, which performs the actual data manipulation of any of the files in the memory devices. Before the printer accesses any of the memory devices, the Emulation Manager checks to see if any interpreter is busy, which may be the case typically because an interpreter is currently running. If that is the case, a command is sent to the interpreter asking it to pause, and the interpreter will temporarily shut down while the memory device is accessed for either a read or write operation. Once the file accessing operation has been completed, the interpreter is allowed to begin running again and the printer continues its printing procedures.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
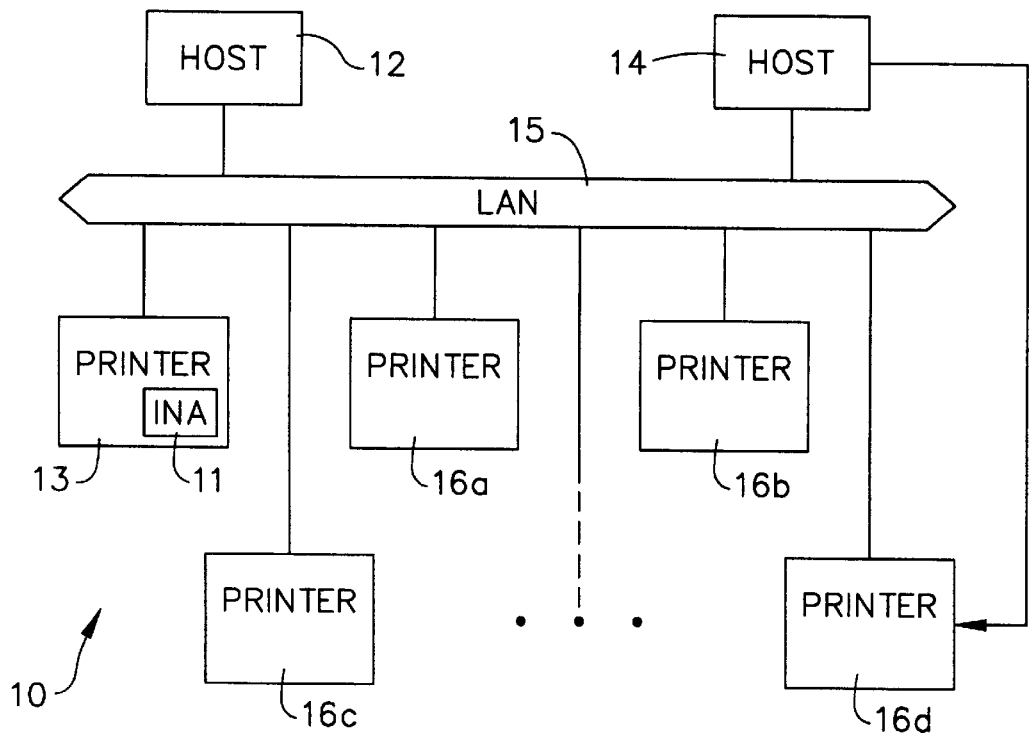
FIG. 1 is a diagrammatic view of a network system having multiple host computers and multiple printers, as relevant to the present invention.

Referring now to the drawings, FIG. 1 shows an exemplary interface between multiple host computers 12 and 14 and multiple printers, generally designated by the index numerals 13, 16a, 16b, 16c, and 16d. Printer 13 includes an internal network adapter (INA) 11, located within the printer housing and the other printers also preferably include such an INA. INA 11 is connected to host computers 12 and 14 through a network, such as the local area network (LAN) designated by the index numeral 15. INA 11 is preferably of a type described in a co-pending commonly-assigned U.S. patent application, Ser. No. 08/350,860, titled MULTIPLE VIRTUAL PRINTER NETWORK INTERFACE, filed on Dec. 7, 1994, now U.S. Pat. No. 5,550,957, issued on Aug. 27, 1996, and which is expressly incorporated by reference herein.

The host computers 12 and 14 can be installed in close proximity to one or more of the printers of FIG. 1, however, when operated according to the principles of the present invention, such host computers can be located quite remote from these printers. The overall system, generally designated by the index numeral 10, can be spread in practical use across an entire building, or across several buildings. Each of the printers 13, 16a, 16b, 16c, and 16d, may be of the same type or of different models, but are preferably manufactured by Lexmark International, Inc. located in Lexington, Kentucky; such preferred printers can be either monochromatic, such as Lexmark Models 4039 plus, or OPTRA™, or could be color printers such as the Model 4079 plus.

In all cases, it is preferred that the printers of system 10 have bi-directional capabilities and that they operate according to the industry standard known as the Network Printing Alliance Protocol (NPAP). The NPAP includes a capability in which a particular manufacturer can provide optional features using "extensions," in which each extension includes a command that will be properly understood only by that particular manufacturer's printer. For example, extensions used by Lexmark printers may include in each NPAP packet communicated over the LAN 15 a command byte having a value of E0 in hexadecimal. Printers manufactured by Lexmark International Inc. will respond to such commands written under the Lexmark extension, but printers manufactured by other companies would usually ignore any packet that contained the E0 command byte.

Figure 2:
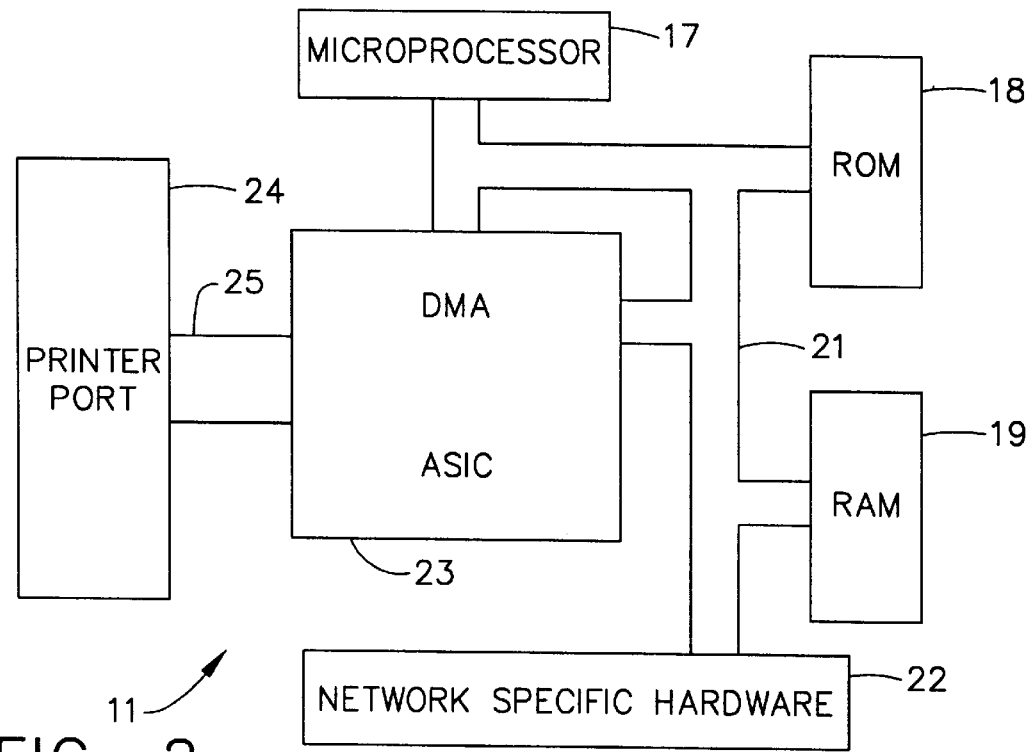
FIG. 2 is a block diagram of the internal network adapter that resides inside the printers of FIG. 1.

Referring now to FIG. 2, the internal network adapter (INA) 11 includes a microprocessor 17 and associated read only memory (ROM) 18 and random access memory (RAM) 19, accessible to the microprocessor on a bus 21. In the present form of adapter, the microprocessor 17 is an Intel 80186 microprocessor; and host data received at a network specific hardware interface 22 is transferred by a direct memory access (DMA) controller ASIC 23 into the RAM 19. The DMA operation may be controlled by the microprocessor 17 or by the network specific hardware 22, dependent upon the network hardware platform to which the INA 11 is attached. Data read from the network specific hardware 22 into the RAM 19 is subsequently transferred across a printer port 24 by the DMA controller ASIC 23.

In the illustrated system, the network operating system is Novell Netware 2.2 or 3.11 or later. As shall be described subsequently, the host computers operating on the Novell Operating System network are set up to send NPAP-compliant commands to a particular "socket", or logical address, of the network specific hardware 22. Therefore, non-NPAP information, received at a different socket, can be transferred to the printer port 24 without processing in the manner that NPAP commands are processed by the microprocessor 17. The NPAP information is processed by the microprocessor 17 in accordance with the present invention, as shall be described subsequently.

To communicate data to the printer port 24, the data is presented on data lines, and one mode of a number of modes of communication is established by command lines. The data lines and command lines are collectively designated 25. Settings of the command lines can place the port 24 into data mode, menu mode, NPAP status mode or Device Status Alert (DSA) mode. In data mode, data is transferred across the printer port 24 to provide page information for print jobs. In menu mode, printer operator panel information is transferred across the printer port 24 from the printer controller to the INA. In NPAP status mode, NPAP-compliant commands are sent from the INA to the printer controller over the printer port 24, with the port remaining in NPAP status mode until an appropriate response is received from the printer controller. In setting DSA mode, the INA responds to a request from the printer controller to be allowed to send a status alert. To do this the INA sets the printer port into DSA mode so that the printer can send the Device Status Alert to the INA.

Figure 3:
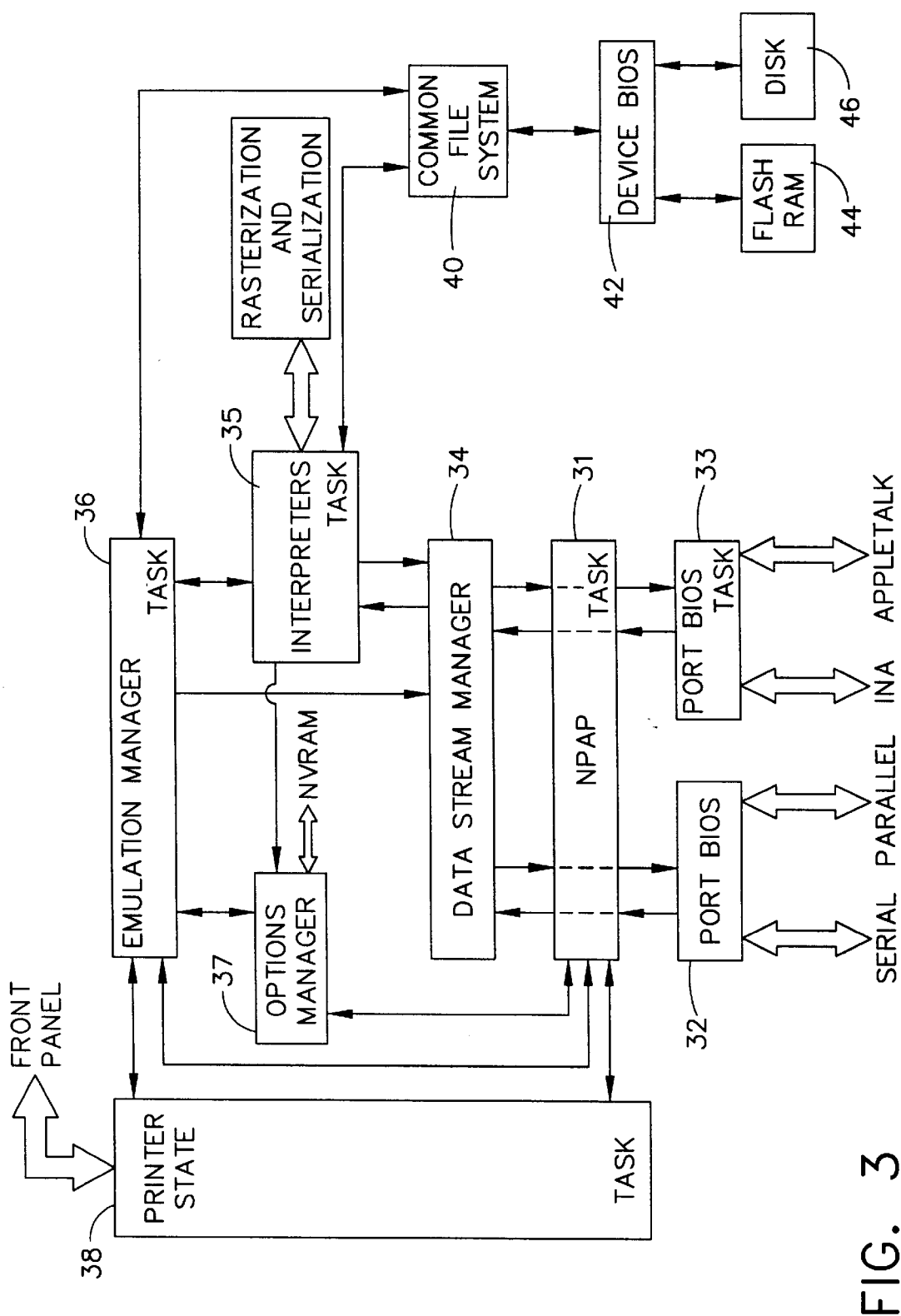
FIG. 3 is a functional block diagram of a controller for the printers depicted in FIG. 1, as relevant to the present invention.

With reference now to FIG. 3, a laser printer for use with the present invention includes a printer controller, the relevant portions of which are shown functionally. The microprocessor-based controller performs functions which include a number of tasks, the relevant ones of which are indicated in the figure, and a number of libraries of code which may be called by the tasks to perform various functions. The tasks are activated by timer counts or interrupts to perform functions, as shall be described.

The exemplary printer controller is capable of effecting the usual printer functions such as maintaining a control panel, interpreting incoming print jobs received in one or more printer control languages, and rasterizing and serializing the interpreted data to drive a laser printer engine. The exemplary controller includes the ability to communicate through parallel, serial and network ports bi-directionally using NPAP. The principal task for handling NPAP-compliant commands and data is the NPA Task 31.

The NPA Task 31 performs the functions of handling commands and data in the NPAP (Network Printing Alliance Protocol) format. The NPA Task supplies printer status information to direct attached and network attached host computers and receives requests for such information from the host computers. The NPA Task 31 is activated periodically by a timer, and when it is activated the NPA Task calls the Port BIOS 32 for the serial and parallel ports and the Port BIOS 33 for the INA port or Appletalk port to determine if there is received data at one or more of the ports. If an NPA command is received, the NPA Task 31 responds through the appropriate port either directly or after obtaining needed information from another function in the printer controller. Before describing operation of the NPA Task in more detail, its state as being active or inactive will be described.

The NPA Task may be "on", "off" or "auto" for each port, serial, parallel, INA, or Appletalk. If the NPA Task is off, print data is directly provided from the Port BIOS 32 or 33 to the Data Stream Manager, as shall be described. If the NPA Task is on, then only data in NPAP format will be passed through (after removal of NPAP wrappers) to the Data Stream Manager, with other inputs being rejected. If the NPA Task is in auto mode, then non-NPAP data will be passed through, and the NPA Task processes NPAP commands and data.

When none of the interpreters 35 are running to provide data for subsequent rasterization and serialization in the printer, the Emulation Manager Task 36 looks for print data at a port to direct to the appropriate interpreter. In the absence of the NPA Task 31, the Emulation Manager 36 calls Data Stream Manager 34 functions to transfer print data from the Port BIOS 32 or 33 to a buffer. If the NPA Task is on for a particular port, the Data Stream Manager 34 accesses data from an NPA Task buffer for that port. The Emulation Manager and Data Stream Manager also cooperate to associate a "job structure" with each print job received at a port. The job structure includes an identification number for the print job, the number of pages to be printed, and information on resolution and other specifics. The job structure data is also capable of being modified during the printing process to update the status of the job.

The Emulation Manager 36 also cooperates with the Data Stream Manager 34 to route each print job to the appropriate interpreter (such as a PostScript or a PCL interpreter) for that print job. The Data Stream Manager passes the print job data in the appropriate language to the selected interpreter until the end of the job, when the Data Stream Manager provides an end-of-job condition to the interpreter. When the interpreter is finished with the print job, it indicates this to the Emulation Manager Task, so that the job structure data can be modified if desired. The interpreted print jobs are provided on a page by page basis to graphics engine software and print mechanism hardware for eventual rasterization of the pages to be printed and serialization of the bit map information to the print mechanism. As used herein, it will be understood that the terms "print job data" or "print job information" refer to anything used to formulate a print job, including such data as: ASCII text information, fonts, macros, symbol sets, or datastream (e.g., PCL, PostScript, PPDS, and PJL).

A Common File System (CFS), designated by the index numeral 40, is provided to control the reading and writing of data from and to the memory devices of the printer. The Common File System 40 preferably interfaces with the Emulation Manager 36 and with the memory device BIOS 42, which performs the physical transfer of data to and from the memory devices. Typical memory devices in a laser printer are Read Only Memory (ROM), font cards installed by a user/Network Administrator to customize a laser printer, flash RAM, and hard disk drives. For the purposes of the present invention, the flash RAM 44 and hard disk drive 46 will be discussed in greater detail, hereinbelow.

The Options Manager Library 37 provides a high level interface through NVRAM BIOS to non-volatile RAM in the printer. Options Manager 37 is used by the Emulation Manager Task 36 in creating job structure information where such information is derived from NVRAM values. The NPA Task 31 also can communicate with the Options Manager 37 to read and write NVRAM settings.

The Printer State Task 38 first learns of outside (to the controller code) events occurring in the printer. The Printer State Task 38 notes, for example, if the printer cover has been opened and orchestrates providing this information to the front panel and to any other users of such information such as the NPA Task 31. The Printer State Task will become aware of certain conditions due to hardware interrupts to the processor, while other status information is checked by the Printer State Task 38 on a polling basis. Printer configuration changes, Device Status Alerts, and changes to the printer front panel are passed from the Printer State Task 38 to the NPA Task 31 for communication to attached host computers.

It will be understood that other hardware and software configurations for implementing the laser printer 13 could be substituted for the illustrated embodiment without departing from the principles of the present invention. This is particularly true for the arrangement of software/firmware used by laser printer 13, as depicted in FIG. 3—the Options Manager 37 and its method of controlling the NVRAM could be designed to operate in various manners, while still effectively performing the same tasks.

The preferred laser printer 13 will include an operator control panel which can be either manually-accessed by a local user, or remotely-accessed over the LAN by a Network Administrator. Such laser printers are currently available, an example of which is the Model OPTRA™, manufactured by Lexmark International, Inc.

It will be understood that the precise embodiments illustrated in FIG. 2 and 3 are not required to perform the functions of the present invention, however, to utilize the NPAP industry standard, a laser printer must have bi-directional communications capability, and it must have the capability to store configuration information in a memory (preferably a non-volatile memory) that can be configured from a remote host computer. Furthermore, such a laser printer should have the capability of having its configuration information contents uploaded into a host computer, so that the host computer can store that same configuration information upon its own storage media, such as in a file residing on a hard disk drive. Once a file is created at the host computer, it will be understood that the contents of such file can either be directly downloaded to other laser printers on the network, or that the file's contents could be manipulated so that individual operating characteristics of a laser printer can be modified by a Network Administrator, although that extra individual manipulation capability may not be desirable in certain circumstances.

Figure 4:
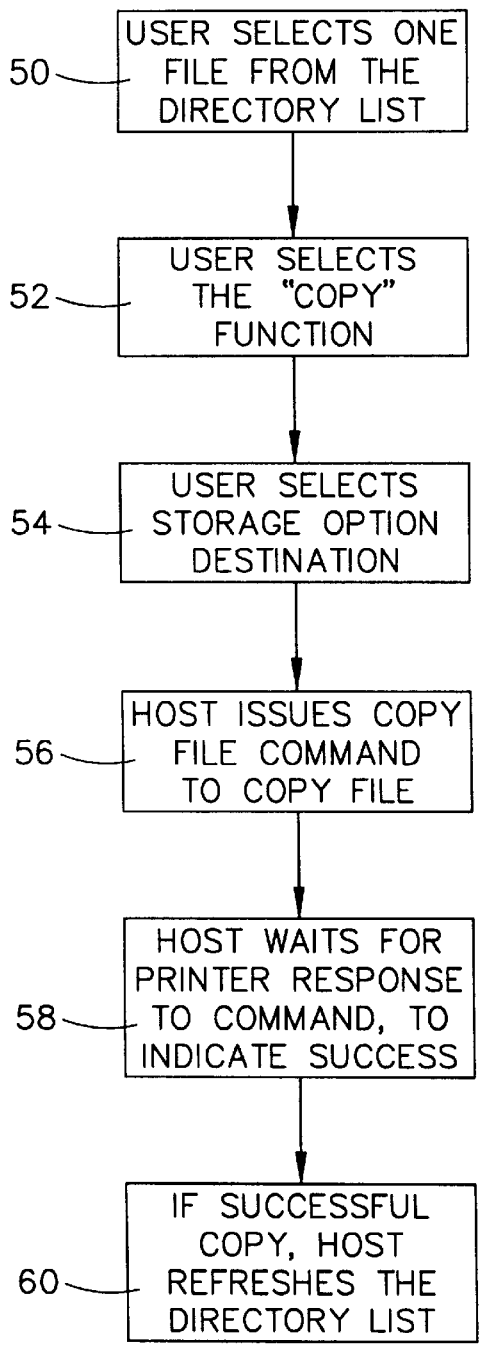
FIG. 4 is a flow chart of the operation of one of the host computers of FIG. 1, depicting the logical steps to perform a "copy file" command within a particular printer, according to the principles of the present invention.

FIG. 4 depicts a flow chart of the steps that a host computer (e.g., host 12) must undergo to have a file copied within a printer's own memory storage media (e.g., to or from its own hard disk drive, from or to its own flash RAM). The user or Network Administrator (either person can perform these operations) must access a computer program at the host 12, which preferably is a WINDOWS-compatible program such as MARKVISION®, produced by Lexmark International, Inc. located in Lexington, Ky. To perform a "copy" command, the user/Network Administrator first selects one particular file from the directory list of a memory device on a particular laser printer, according to the function block designated by the index numeral 50. An exemplary display that shows the directory list is provided in FIG. 8, generally designated by the index numeral 70.

When the host 12 first calls up a directory from one of the printers, an NPAP command for a "device file listing" is transmitted from the host to a particular printer having a format shown in the upper portion of Table #1, below:

TABLE #1

5-6-1 Device File Listing

Host Command

| Command: | | Lexmark Extension | | |
|---|---|---|---|---|
| Subcommand: | | Device File Listing | | |
| Byte | Value - Hex | Description | | Notes |
| 1 | A5 | Start of Packet Byte | | Packet Header |
| 2 | Unsigned Word | Length in Bytes (Does not include these 2 bytes nor the SOP byte) | | |
| 1 | Unsigned Byte | Flag | | |
| 1 | E0 | Command: | Lexmark Extension | |
| 1 | 10 | Subcommand: | Device File Listing | Data Field |

TABLE #1-continued

| 1 | 0 × 01 | Disk | |
|---|---|---|---|
| | 0 × 02 | Flash | |
| 1 | Unsigned Byte | Length of file name, not including this byte | |
| n | ASCII | NULL terminated ASCII representation of the file name. | |

Printer Response

Command: Lexmark Extension
Subcommand: Device File Listing

| Byte | Value - Hex | Description | | Notes |
|---|---|---|---|---|
| 1 | A5 | Start of Packet Byte | | Packet Header |
| 2 | 00 04 | Length in Bytes (Does not include these 2 bytes nor the SOP byte) | | |
| 1 | Unsigned Byte | Flag | | |
| 1 | E0 | Command: | Lexmark Extension | |
| 1 | 10 | Subcommand: | Device File Listing | Data Field |
| 1 | Unsigned Byte | Alert Identification Number, assigned by the printer. | | |

Note: The format of this name(wildcard specifications . . .) can be found in the Common File System High Level Design.
Note: This command is available in printer specific extension revision level 2 or greater.

After the particular file has been selected at function block 50, the user/Network Administrator selects the "copy" function (at function block 52) by moving the cursor (typically using a mouse) to the "Copy" button 72 (see FIG. 8), and "clicking" on that button. After the Copy button 72 is actuated, the monitor will provide a new display screen, such as given in FIG. 9 at the index numeral 170. At screen 170, the user/Network Administrator chooses the "source file name" at 172 and the "source resource" (i.e., memory device) at 174. At function block 54 the user/Network Administrator selects the memory device that is to be the destination for the data file that is being copied (i.e., the Destination Resource" at 176). If a laser printer contains only two memory resources, such as flash RAM and a hard disk drive, then the user/Network Administrator is restricted to selecting only the opposite memory device as compared to the device from which the data file originated. In other words, in this example if the file is currently stored on the flash RAM memory device, the user/Network Administrator could select only the hard disk drive as the destination.

At function block 56, the host 12 issues a "copy file" command to one of the printers (e.g., printer 13) that are connected to the network (e.g., LAN 15) upon actuation of the "OK" button 178. An NPAP command is transmitted from host 12 to printer 13 using a "copy file" command having a format as follows:

$$A5 \text{ xx xx xx } E0 \text{ 14 0x xx [data\_1] 0x xx [data\_2]}.$$

The designator "[data_1]" represents data that contains the original filename (in ASCII) and the designator "[data_2]" represents data that contains the "new" filename (in ASCII). The exact format of the copy file command from the host is given in the upper portion of Table #2 below:

TABLE #2

5-6-5 Copy File

Host Command

Command: Lexmark Extension
Subcommand: Copy File

| Byte | Value - Hex | Description | | Notes |
|---|---|---|---|---|
| 1 | A5 | Start of Packet Byte | | Packet Header |
| 2 | Unsigned Word | Length in Bytes (Does not include these 2 bytes nor the SOP byte) | | |
| 1 | Unsigned Byte | Flag | | |
| 1 | E0 | Command: | Lexmark Extension | |
| 1 | 14 | Subcommand: | Copy File | Data Field |
| 1 | 0 × 00 | Device specification included in file name | | |
| | 0 × 01 | Disk | | |
| | 0 × 02 | Flash | | |
| 1 | Unsigned Byte | Length of file name, not including this byte | | |
| n | ASCII | NULL terminated ASCII representation of the Original file name. | | |
| 1 | 0 × 00 | Device specification included in file name | | |
| | 0 × 01 | Disk | | |
| | 0 × 02 | Flash | | |
| 1 | Unsigned Byte | Length of the file name, not including this byte. | | |
| n | ASCII | NULL terminated ASCII representaion of the New file name. | | |

TABLE #2-continued

Printer Response

Command: Lexmark Extension
Subcommand: Copy File

| Byte | Value - Hex | Description | Notes |
|---|---|---|---|
| 1 | A5 | Start of Packet Byte | Packet Header |
| 2 | 00 04 | Length in Bytes (Does not include these 2 bytes nor the SOP byte) | |
| 1 | Unsigned Byte | Flag | |
| 1 | E0 | Command: Lexmark Extension | |
| 1 | 14 | Subcommand: Copy File | Data Field |
| 1 | Unsigned Byte | Alert Identification Number, assigned by the printer. | |

Note: This command is only available in printer specific extension revision level 2 or greater.

As can be seen from an inspection of Table #2, the "copy file" NPAP command indicates the file to be copied and the destination memory device (also referred to herein as the "destination storage option").

At function block 58, host 12 waits for a response from printer 13 to the copy file command, which will indicate success or a lack thereof. The printer will send an NPAP "alert" to host 12 when the copy command is complete. Part of the alert data indicates the success or failure of the command. The exact format of the printer response is provided in the lower portion of Table #2.

Figure 8:
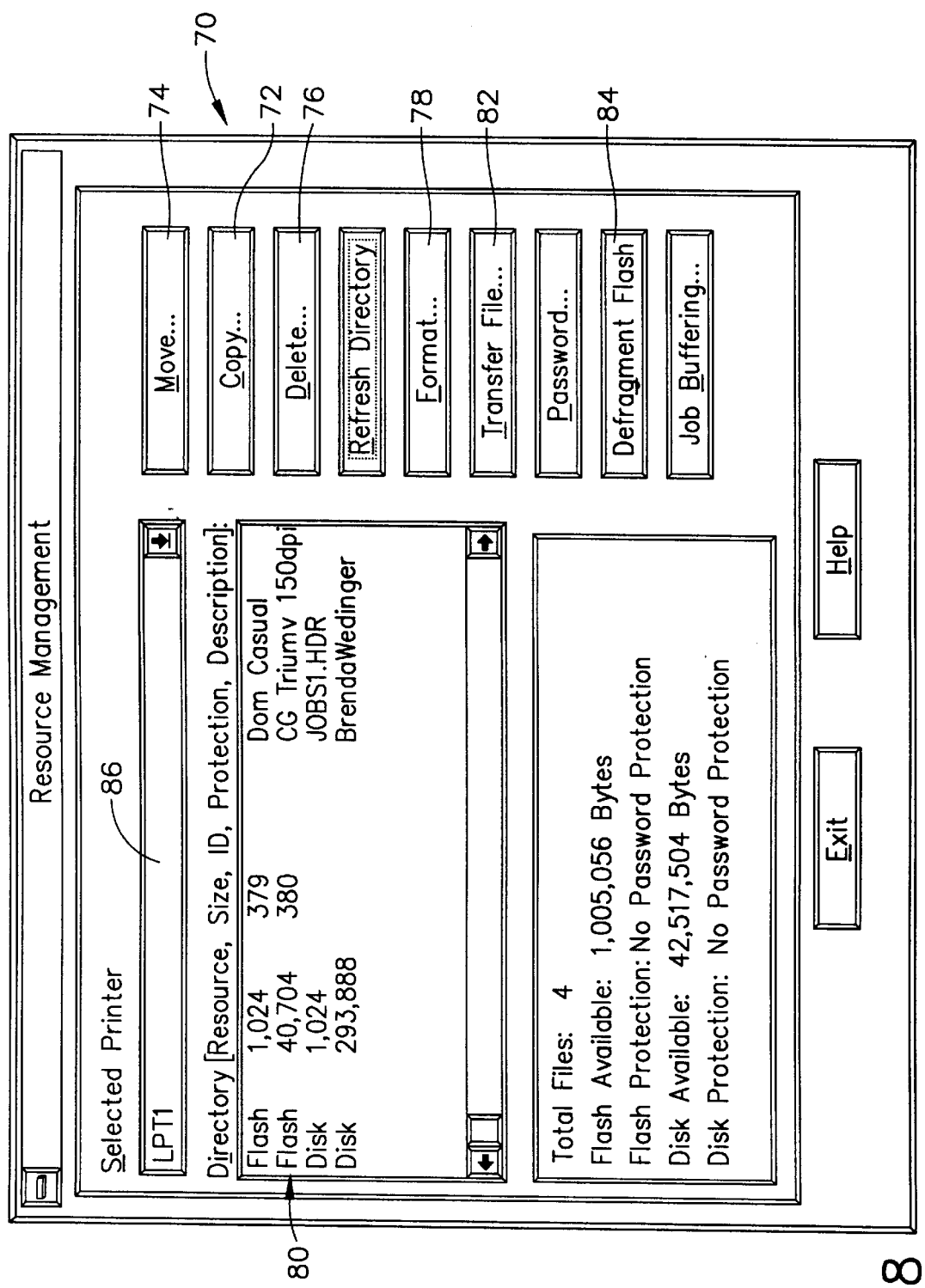
FIG. 8 is a diagrammatic view of one of the display screens of the host computer depicted in FIG. 1, showing a directory while utilizing the "resource management" feature according to the present invention.

If the copy command has been successful, the host 12 will refresh the directory list at function block 60. The computer display, as depicted in FIG. 8, will show a new status of the destination memory device as now including the particular data file (e.g., at data field 80 on display 70) that was just copied into that memory device. It will be understood that the copy file function is only available for a printer that has more than one memory device (or storage option) installed.

The host computer 12 may also command the printer to "move" a file within the printer's own memory storage media, and this "move" command may be used to rename the file within the same memory device, or may literally move the file from one memory device to a second memory device. As will be easily understood, the difference between a copy command and a move command is that two files containing the same data will be in existence at the end of a copy command, whereas only one file containing the specific data will be in existence at the end of a move command.

To implement a move command, virtually the same steps as provided in the flow chart of FIG. 4 are used, however, all references to the "copy" command are changed to the "move" command. For example, at function block 52, the "Move" button 74 is selected instead of the "Copy" button 72 which brings up the display screen 180 on FIG. 10. The user/Network Administrator now chooses the "Source File Name" at 182 and "Source Resource" at 184. At function block 54, the user/Network Administrator must now select a "storage option" (i.e., memory device) as the destination of the newly-moved or renamed file at 186 on FIG. 10. At function block 56, the host issues a "rename file" command instead of a "copy file" command upon actuation of the "OK" button 188, and this rename file command has a format that is given in the upper portion of Table #3 below:

TABLE #3

5-6-3 Rename File

Host Command

Command: Lexmark Extension
Subcommand: Rename File

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension | |
| 1 | 12 | Subcommand: Rename File | Data Field |
| 1 | 0 x 00 | Device specification included in file name | |
|   | 0 x 01 | Disk | |
|   | 0 x 02 | Flash | |
| 1 | Unsigned Byte | Length of file name, not including this byte | |
| n | ASCII | NULL terminated ASCII representation of the file name. | |
| 1 | 0 x 00 | Device specification included in the new file name | |
|   | 0 x 01 | Disk | |
|   | 0 x 02 | Flash | |
| 1 | Unsigned Byte | Length of the new file name, not including this byte | |
| n | ASCII | NULL terminated ASCII representation of the new file name. | |

TABLE #3-continued

Printer Response

Command: Lexmark Extension
Subcommand: Rename File

| Byte | Value - Hex | Description | Notes |
|---|---|---|---|
| 1 | A5 | Start of Packet Byte | Packet Header |
| 2 | 00 04 | Length in Bytes (Does not include these 2 bytes nor the SOP byte) | |
| 1 | Unsigned Byte | Flag | |
| 1 | E0 | Command: Lexmark Extension | |
| 1 | 12 | Subcommand: Rename File | Data Field |
| 1 | Unsigned Byte | After Identification Number, assigned by the printer. | |

Note: This command is only available in printer specific extension revision level 2 or greater.

As can be seen in Table #3, the "rename file" NPAP command indicates the file to be copied and the destination memory device. At function block 58, host 12 again waits for a response from printer 13 (to a "rename file" command), which will indicate success or a lack thereof. The printer will send an NPAP "alert" to host 12 when the rename file command is complete. The exact format of the printer response is provided in the lower portion of Table #3. If the rename file command has been successful, host 12 will refresh the directory list at function block 60, and the computer display (as seen in FIG. 8) will show a new status of the destination memory device as now including the particular data file that was just renamed into that memory device.

Figure 5:
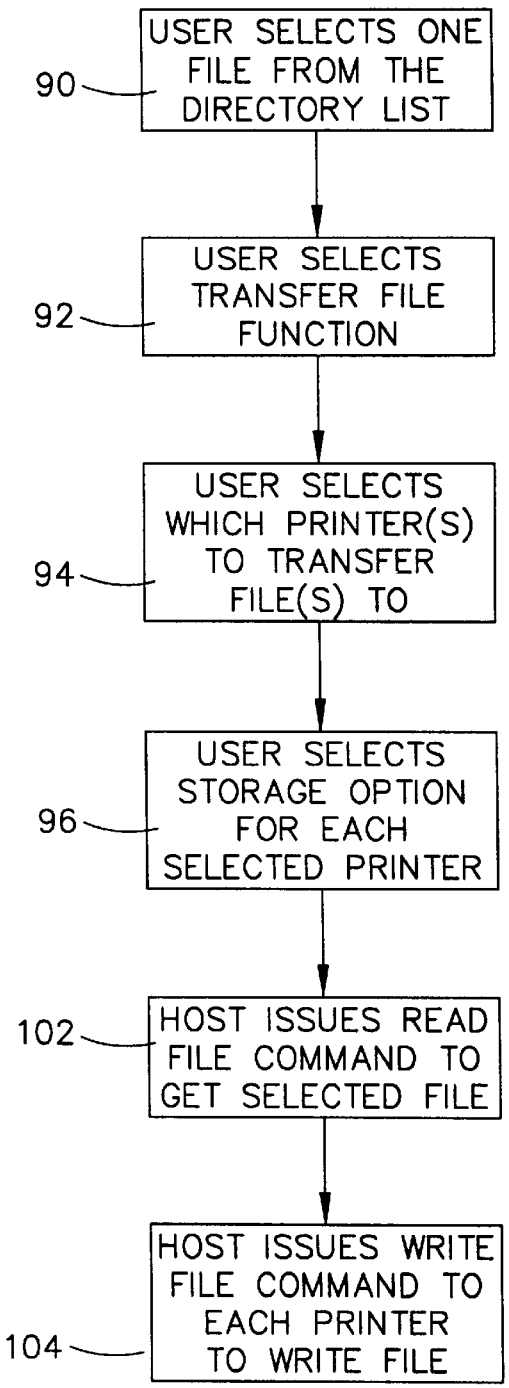
FIG. 5 is a flow chart of the operation of one of the host computers of FIG. 1, depicting the logical steps required to perform a "file transfer" from one printer to a second printer, according to the principles of the present invention.

FIG. 5 depicts a flow chart of the steps that a host computer (e.g., host 12) must undergo to have a file contained within a memory device of one printer transferred or copied to a memory device of a second printer, via a network. In a system having laser printers that each contain two memory devices, e.g., a flash RAM and a hard disk drive, the originating device can be either of the memory devices of the first printer, and the destination device can be either of the memory devices of the second printer. A user or Network Administrator must access a computer program at host 12, which preferably is the MARKVISION® computer program, manufactured by Lexmark International Inc. located in Lexington, Kentucky. To initiate a "file transfer" command, the user/Network Administrator selects one particular file from the directory list of a memory device on a particular laser printer, according to the function block designated by the index numeral 90, on FIG. 5. FIG. 8 provides an exemplary display 70 that shows the directory list. This directory list is produced at the monitor of host 12 by calling for the directory information from one of the printers on the network. This occurs by the transmission from the host to the particular printer of an NPAP command for a "device file listing", as shown in the upper portion of Table #1. The "source" printer is chosen from the field 86 of printers on the network.

After the particular file has been selected at function block 90, the user/Network Administrator selects the "file transfer" function (at function block 92) by moving the cursor or mouse to the "Transfer File" button 82 (see FIG. 8), and clicking on that button. At function block 94, the user/Network Administrator selects whether the transferred file is to be sent to either one printer, or multiple printers that are attached to the network. After a user/Network Administrator has selected a file and the file transfer function, the user/Network Administrator would typically be viewing a display screen such as that depicted in FIG. 13A, which can be used to select either a single printer or multiple printers (as per function block 94).

Once the destination(s) have been selected, the user/Network Administrator (at function block 96) selects which storage options are to receive the file on that destination printer(s). These "storage options" will consist of the memory devices at that printer(s), typically either flash RAM or a hard disk drive. At this point, the user/Network Administrator would typically be viewing a display screen such as that depicted in FIG. 13B, which can be used to select either of the appropriate storage option(s) at the selected printer(s) (as per function block 96). Once this has occurred, the host computer is ready to commence the transferring of the file (typically by clicking on an "OK" button 226 (described in more detail below). Optionally, a checksum command can be sent to instruct the printer to generate a checksum of the file before it is transferred, and then after the transfer, a checksum is again done to ensure data integrity. It will be understood that, at function block 96, only certain types of printers will be listed for selection at the host monitor, which will be printers that support "read file" and "write file" NPAP commands.

Figure 13:
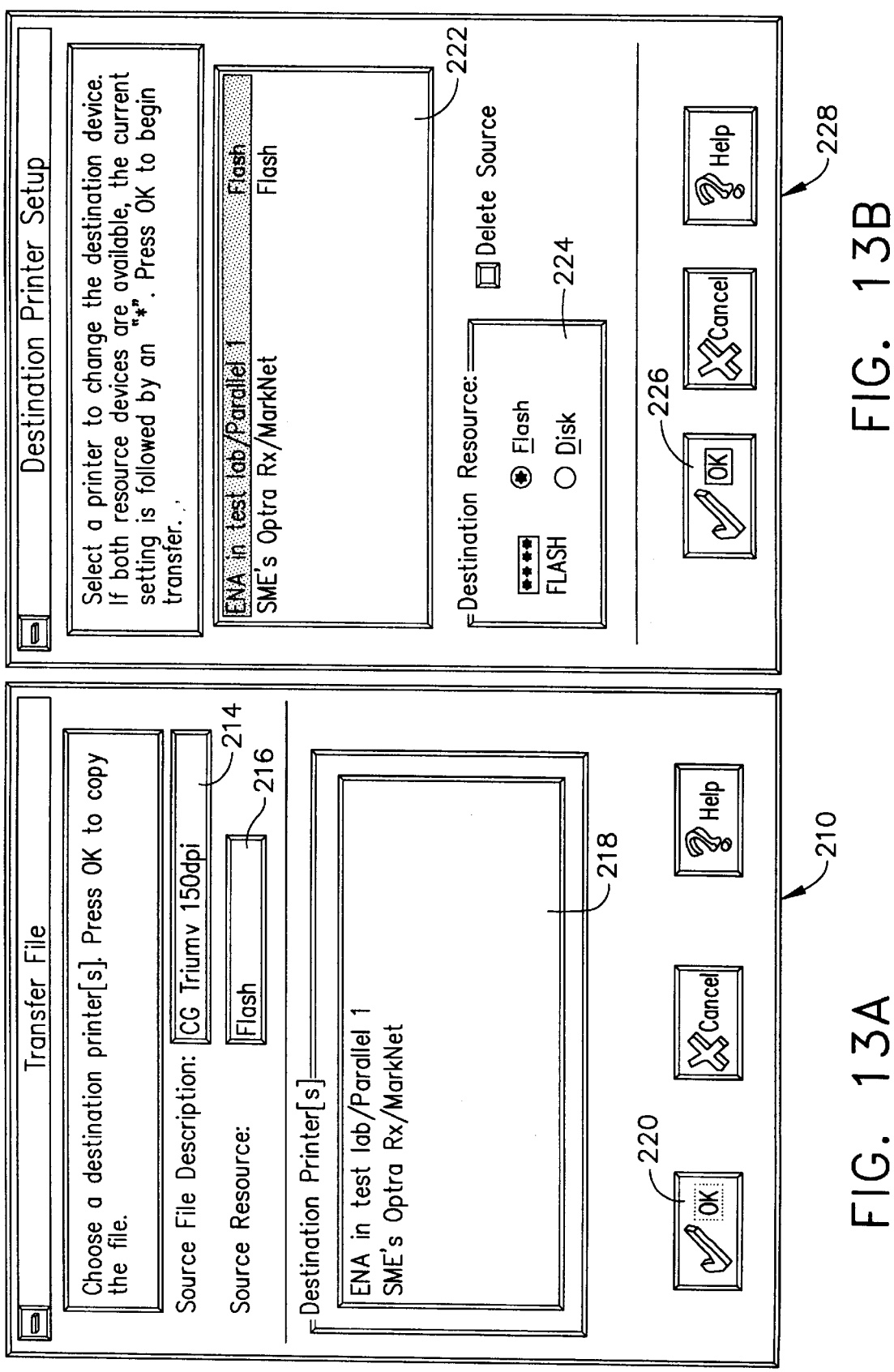
FIGS. 13A and 13B are diagrammatic views of the display screens of the host computer depicted in FIG. 1, while performing a "file transfer" function of the resource management system according to the present invention.

FIG. 13A shows a "Transfer File" display screen 210, which appears on the computer monitor after the "Transfer File" button 82 is used on display screen 70. Once at file transfer screen 210, the source file name and source resource (i.e., memory device) are entered in data fields designated by the index numerals 214 and 216, respectively. The destination printer (or printers) is indicated in a field 218. The user/Network Administrator must operate the "OK" button 220 to bring up the next display 228 (on FIG. 13B). Other common WINDOWS-type buttons are also provided on screen display 210.

Display screen 228 is provided on FIG. 13B, and includes a field 222 that indicates which memory device of the selected printer(s) is to receive the file being transferred. The field 224 lists the available types of memory devices that the printer(s) may contain. To execute the transfer file command, the user/Network Administrator must operate the "OK" button 226.

At a function block 102, the host computer (e.g., host 12) issues a "read file" command to have that particular file (in the selected printer on the network) transferred from the printer to the host computer, where the file is temporarily stored until the subsequent write command takes place. If the entire file cannot be retrieved with a single read file command, then subsequent read file commands are issued to obtain the complete file back at the host computer. The "read file" command is transmitted from the host to the source printer by a message having a format shown in the upper portion of Table #4, as seen below:

TABLE #4

5-6-14 Read from a File

Host Command

Command: Lexmark Extension
Subcommand: Read from a File

| Byte | Value - Hex | Description | Notes |
|---|---|---|---|
| 1 | A5 | Start of Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension | |
| 1 | 1D | Subcommand: Read from a File | Data Field |
| | 0 × 00 | Device specification included in file name | |
| | 0 × 01 | Disk | |
| | 0 × 02 | Flash | |
| 1 | Unsigned Byte | Length of file name, not including this byte | |
| n | ASCII | NULL terminated ASCII representation of the file name. | |
| 1 | Unsigned Byte | Number of bytes to be sent back to the host | |
| 4 | Unsigned Double Word | offset from the top of the file. | |

Printer Response

Command: Lexmark Extension
Subcommand: Read from a File

| Byte | Value - Hex | Description | Notes |
|---|---|---|---|
| 1 | A5 | Start of Packet Byte | Packet Header |
| 2 | 00 04 | Length in Bytes (Does not include these 2 bytes nor the SOP byte) | |
| 1 | Unsigned Byte | Flag | |
| 1 | E0 | Command: Lexmark Extension | |
| 1 | 1D | Subcommand: Read from a File | Data Field |
| 1 | Unsigned Byte | Alert Identification Number, assigned by the printer. | |

Note: This command is only available in printer specific extension revision level 5 or greater.
This command will read some number of bytes, from a starting offset, back to the host. The actual bytes are returned in the device alert.

The selected printer (i.e., the "source" printer) will respond with a message having a format as shown in the lower portion of Table #4. This printer response will be an NPAP "Alert", and the host could possibly receive other printer alerts while waiting for this response. The host will continue to wait for all alerts to arrive until it receives the correct alert from the source printer.

Once the host has received the entire file (typically comprising print job data) from the source printer, the host will prepare to transmit or "write" this file to each printer on the network that has been designated as a "destination" printer. This function occurs at function block 104, and the "write" command from the host has a format as shown in the top portion of Table #5, shown below:

TABLE #5

5-6-15 Write to a File

Host Command

Command: Lexmark Extension
Subcommand: Write to a File

| Byte | Value - Hex | Description | Notes |
|---|---|---|---|
| 1 | A5 | Start ot Packet Byte | Packet Header |
| 2 | Unsigned Word | Length in Bytes (Does not include these 2 bytes nor the SOP byte) | |
| 1 | Unsigned Byte | Flag | |
| 1 | E0 | Command: Lexmark Extension | |
| 1 | 1E | Subcommand: Write to a File | Data Fied |
| 1 | 0 × 00 | Device specification included in file name | |
| | 0 × 01 | Disk | |
| | 0 × 02 | Flash | |
| 1 | Unsigned Byte | Length of file name, not including this byte | |
| n | ASCII | NULL terminated ASCII representation of the file name. | |
| 1 | Unsigned Byte | Number of bytes to write to the file, not including this byte | |
| n | Binary | Bytes to write to the file. | |
| 4 | Unsigned Double Word | offset from the top of the file. | |

TABLE #5-continued

Printer Response

Command: Lexmark Extension
Subcommand: Write to a File

| Byte | Value - Hex | Description | Notes |
|---|---|---|---|
| 1 | A5 | Start of Packet Byte | Packet Header |
| 2 | 00 04 | Length in Bytes (Does not include these 2 bytes nor the SOP byte) | |
| 1 | Unsigned Byte | Flag | |
| 1 | E0 | Command: Lexmark Extension | |
| 1 | 1E | Subcommand: Write to a File | Data Field |
| 1 | Unsigned Byte | Alert Identification Number, assigned by the printer. | |

Note: This command is only available in printer specific extension revision level 5 or greater.
This command will write some number of bytes to a file, starting from the specified offset. Acknowledgment of the result of the operation is sent in the device alert.

If the entire file cannot be written with one "write" command, subsequent write file commands are issued by the host until the entire file has been transferred to the destination printer or printers. After each "write file" data transfer (which occurs in NPAP packets), the host waits for a response from the destination printer that indicates either the success of the transfer of data to the printer, or the failure thereof. The format of this printer response is given in the bottom portion of Table #5.

Figure 6:
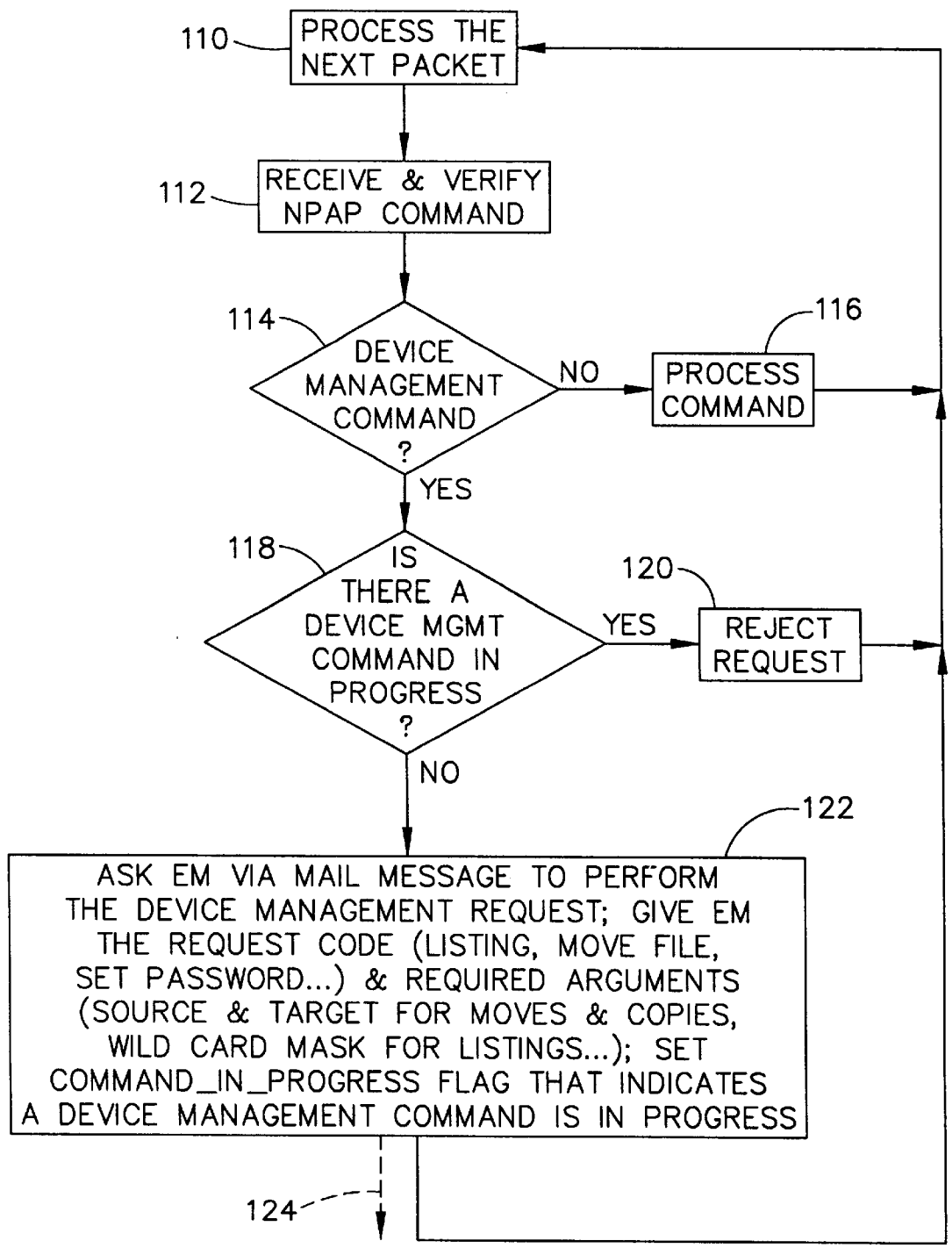
FIG. 6 is a flow chart of a portion of the operation of one of the printers depicted in FIG. 1, showing a portion of the NPAP logical operational steps required to process a "resource management" command that is received by the printer, according to the principles of the present invention.

FIG. 6 depicts a flow chart of the operation of a printer that is configured to accept "resource management" commands via a network, such as printer 16a of FIG. 1. When such a printer receives a message such as an NPAP command, at function block 110, the printer first brings in that NPAP packet and verifies that it is an NPAP command (at function block 112). The printer now determines whether or not there is a "device management command," at decision block 114. (A device management command is also sometimes referred to herein as a "Common File System request," and these terms will be used interchangeably hereinafter.) If the answer is NO, then the logic flow proceeds to function block 116 where the NPAP command is processed. For the purposes of describing the present invention, there will be no discussion herein of the processing of other types of NPAP commands.

If decision block 114 determines that the received NPAP command is a device management command, then the logic flow follows to another decision block 118, that decides whether or not there already is another device management command presently in progress. The printer does this by inspecting the "command-in-progress" flag, which is an internal signal within the printer that is set while such device management commands are being executed. If there currently is a device management command in progress, then the control logic flows to function block 120, which rejects the request for the newly arrived device management command. This rejection physically occurs by the printer sending a "failure" message back to the host 12 over the network 15.

If there was no device management command in progress upon the reception of the newly arrived device management command message, then the logic flow follows from decision block 118 to function block 122. The printer's NPAP task, via a mail message, asks the Emulation Manager 36 to perform the requested device management command. The proper "request code" is provided to the Emulations Manager, in which such request codes could be for functions such as completing a listing, to move a file, to set a password, etc. In addition, the required "arguments" for the corresponding request code are provided to the Emulation Manager, and such arguments could be the source and destination for move or copy functions used for file manipulations, or for a "wild card mask" for listings, etc. Function block 122 also sets the "command-in-progress" flag, that indicates (to the printer itself) that a device management command is currently in progress. After this has occurred, the logic flow of the NPAP task returns to the "process the next packet" function block 110, however, further processing of the device management request will be performed by the Emulation Manager as described below (see arrow 124 on FIGS. 6 and 7).

Figure 7:
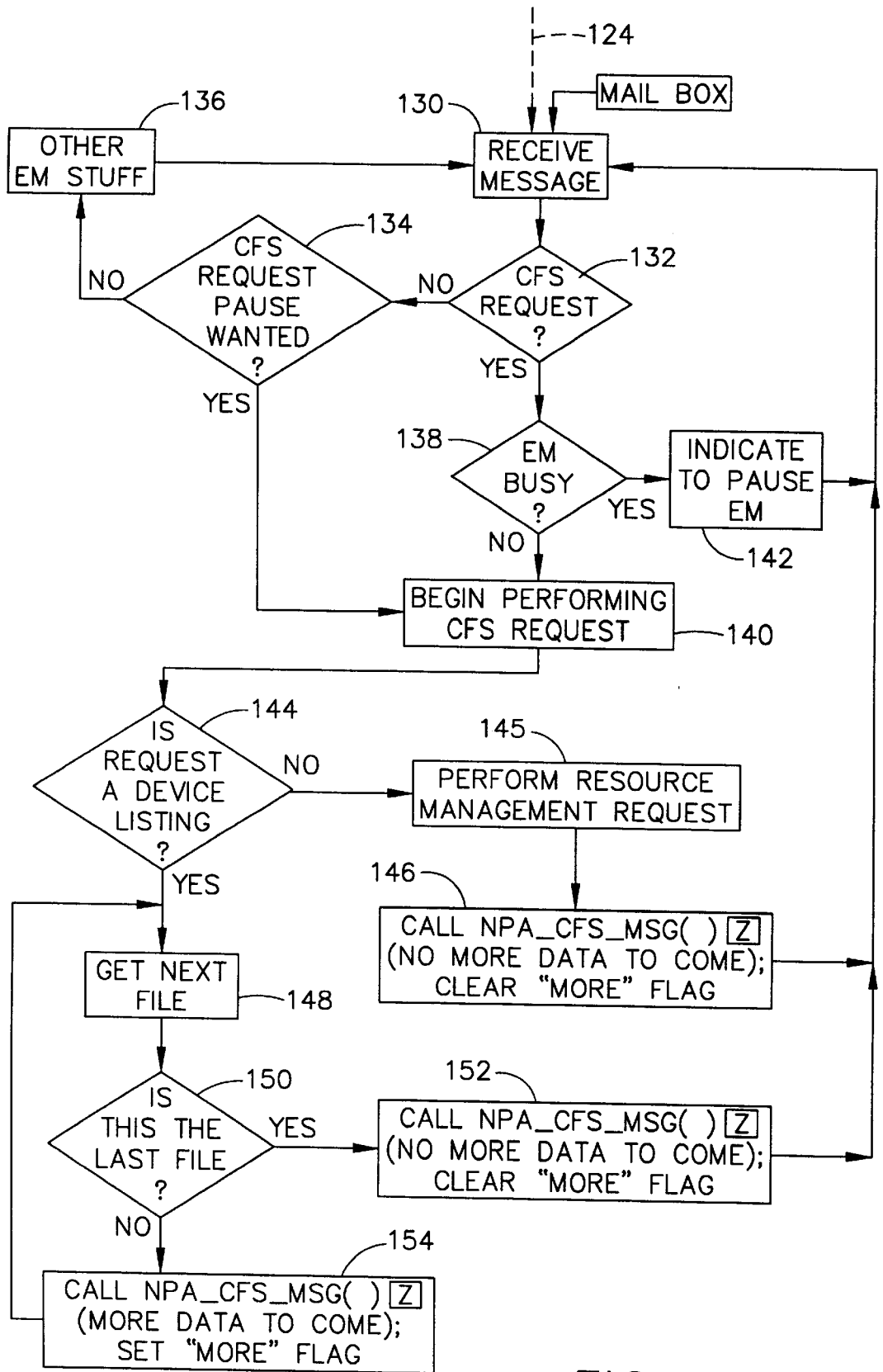
FIG. 7 is a flow chart of the operation of one of the printers depicted in FIG. 1, showing another portion of the Emulation Manager's logical operational steps required to process a resource management command that is received by the printer, according to the principles of the present invention.

On FIG. 7, the logic flow along arrow 124 arrives at a function block having a "receive message" mailbox function, designated by the index number 130. Once the message has been received, the logic flow follows to a decision block 132, which determines whether or not there has been a Common File System (CFS) request within this printer. If the answer to that question is NO, then the logic flow follows to a decision block 134 that determines whether or not the message just received at the receive message "mailbox" 130 will require a pause to be requested so that a task requiring a CFS request can be performed. If the answer to this question is NO, then the logic flow follows to a function block 136, in which other Emulation Manager tasks are being performed, and which are not necessary to the description of the present invention. If the answer at decision block 134 is YES, then the Emulation Manager task is scheduled to perform the CFS request at a function block 140.

At decision block 132, if the answer was YES, then the logic flow travels to another decision block 138, which determines whether or not the Emulation Manager 36 is currently "busy." If the answer is NO, then the logic flow travels to function block 140, and the printer begins performing a CFS request. If the answer at decision block 138 is YES, then the logic flow travels to a function block 142 that indicates to the printer that the Emulation Manager 36 should momentarily pause the interpreter 35, because the interpreter 35 was currently interpreting a print job and creating a bitmap to be sent to the print engine. To expedite the receipt of a CFS request from the NPAP command via the network, it typically would be desirable for the Emulation Manager to momentarily pause the interpreter, receive this CFS request and act on it, and then restart the interpreter (which would then cause the interpreter to become "busy" again). It will be understood that other functions of the printer need not be paused during periods where the interpreter 35 is paused, and in fact, it is preferred that the printer have multi-tasking capabilities. For example, while the interpreter is temporarily paused, other important tasks could continue, such as the printing of pages, and NPAP status and control functions (e.g., receiving NPAP commands at other I/O ports), thereby making this an asynchronous operation (i.e., occurring virtually simultaneously).

At function block 142, the original (NPAP) message is temporarily saved, and a flag is set to indicate that there currently is a CFS request. This is the flag that is inspected at decision block 132. The logic flow now travels back to the receive message (mailbox) function block 130, so that the printer is in a condition to receive further messages. The next message could well be from the interpreter 35 that it has now paused, thereby preparing the way for the Common File System operation to commence. If this were the next message, the logic flow would follow from function block 130 to decision block 132, then at its YES exit to decision block 138, then to its NO exit to the function block 140 that begins performing a CFS request.

Figure 7A:
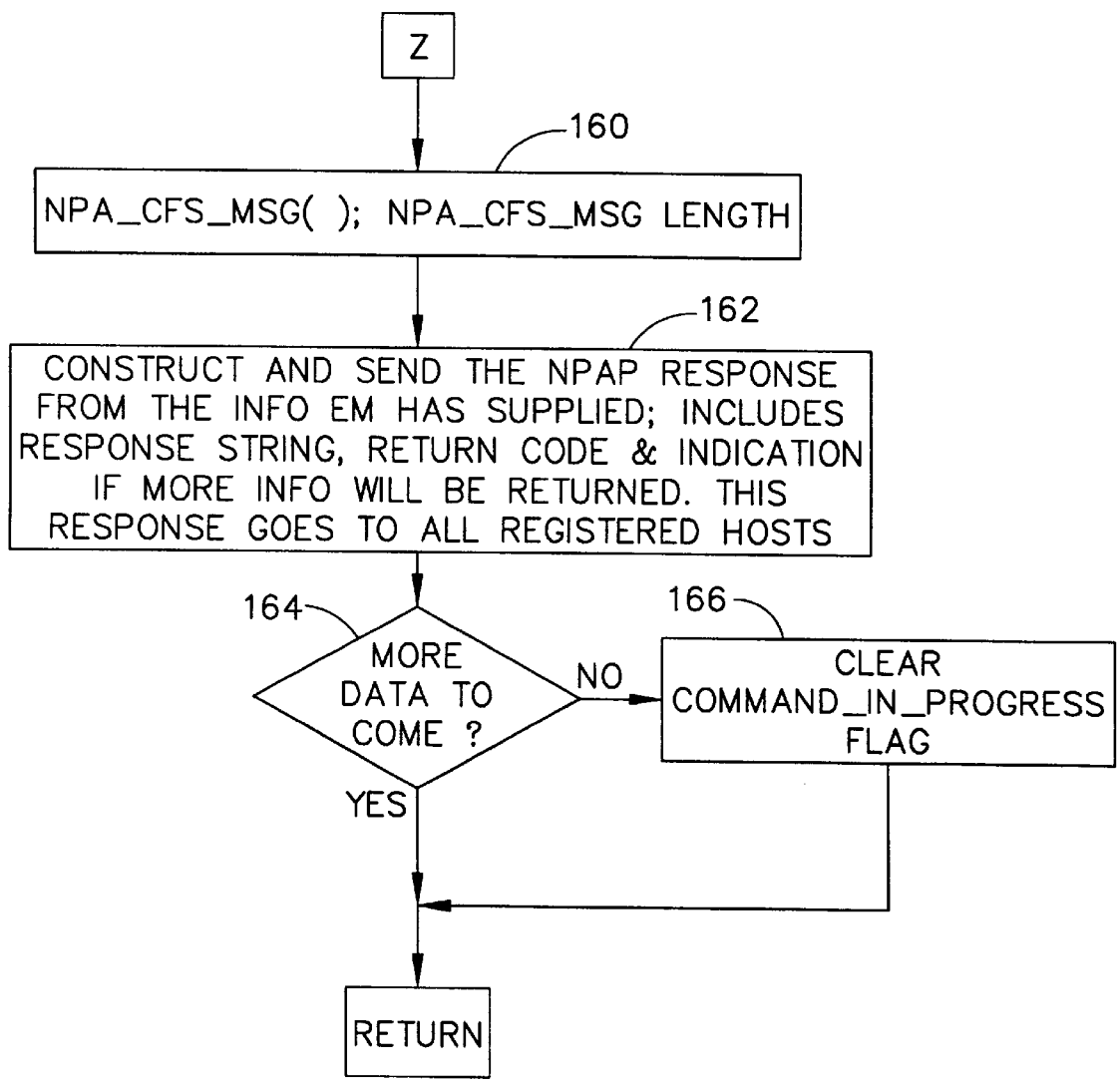
FIG. 7A is a flow chart of the operation of one of the printers depicted in FIG. 1, showing a further portion of the logical operational steps required to process a resource management command that is received by the printer, according to the principles of the present invention.

The logic flow now travels to a decision block 144 that determines whether or not the CFS request is a "device listing." If the answer is NO, the logic flow travels to a function block 145 that performs the Resource Manager Request. Examples of such requests are: copy file, lookup files (directory), delete file, format device, rename file, generate checksum, set passwords, and read and write file data. After this is accomplished, the logic flow is directed to a function block 146 that performs a "task call" NPA__CFS__Msg(__). If no more data is to follow, then the flag designated as the "More" flag is cleared. Whether or not more data is to follow is determined by another portion of the computer program, (i.e., a subroutine or subprogram), which is described on FIG. 7A. In FIG. 7A, a flow chart of the task call NPA__CFS__Msg(__) is provided, and will be described in detail hereinbelow.

If decision block 144 determines that the request is for a device listing, the logic flow follows to a function block 148 that "gets" the "next file." After that has been accomplished, the logic flow follows to a decision block 150 which determines whether or not this is the "last file." If the answer is YES, the logic flow follows to a function block 152 that performs the task call NPA__CFS_$_{Msg(\_)}$, which is the same subroutine that is described in FIG. 7A. Once the logic flow has arrived at function block 152, no more data will follow, and therefore, the "More" flag is cleared.

If this was not the last file (as determined at decision block 150), then the logic flow is directed to a function block 154 which calls the NPA__CFS__Msg(__) subroutine, which is the same subroutine that is described in FIG. 7A. In function block 154, there will definitely be more data to follow, and therefore, the "More" flag is set. After that has been accomplished, the logic flow follows back to the "get next file" function block 148.

On FIG. 7A, the NPA__CFS__Msg(__) subroutine flow chart is described. This is part of the "alert" messaging that occurs in printers that perform the NPAP-compatible functions on network 15. To perform this subroutine, the proper message code and message length must be received (at function block 160). The next step (at a function block 162) is to construct and transmit (back to the host 12) the correct NPAP response from the information that the Emulation Manager 36 has supplied. This NPAP response includes the response string, return code, and an indication as to whether or not more information will be returned. This response is sent to all "registered" hosts on the network 15.

The logic flow now arrives at a decision block 164 that determines whether or not more data is to follow. If the answer is NO, then function block 166 will clear the "command-in-progress" flag. At this point, the subroutine has finished, and the logic flow will return to the calling function block (i.e., one of function blocks 146, 152, or 154 on FIG. 7). If more data is to follow, then the logic flow follows the YES exit of decision block 164, which then returns from the subroutine, as per the previous sentence.

A display screen 70 is depicted on FIG. 8, and would be used to invoke one of the many commands that pertain to manipulations of the Common File System. The various buttons are chosen by the user/Network Administrator while viewing display screen 70, and the "copy file" within a printer function has already been described above (see FIG. 4), and the "transfer file" function has already been described above (see FIG. 5). These two functions are invoked by the buttons 72 and 82, respectively. The move command (using button 74) has also been described above.

A "Delete" button 76 is used to selectively delete one file that is currently contained in one of the printers on the network. In the example of FIG. 8, the directory is given at index numeral 80, which is currently displaying files in the flash RAM memory device. Any one of these files can be highlighted by use of a mouse or cursor (not shown), and the Delete button 76 can then be chosen or "clicked on" by the mouse to then delete that particular file. The delete command may, optionally, also be used to erase more than one file at a time, which would be accomplished by the user/Network Administrator choosing or highlighting more than one of the files shown on directory 80. When the Delete button 76 is selected by the user/Network Administrator, a command will be sent from the host 12 to one of the printers on the network 15, and this message will have a format as provided in the top portion of Table #6, as provided below:

TABLE #6

5-6-2 Delete File

| | | Host Command | | |
|---|---|---|---|---|
| Command: | | Lexmark Extension | | |
| Subcommand: | | Delete File | | |
| Byte | Value - Hex | Description | | Notes |
| 1 | A5 | Start of Packet Byte | | Packet Header |
| 2 | Unsigned Word | Length in Bytes (Does not include these 2 bytes nor the SOP byte) | | |
| 1 | Unsigned Byte | Flaq | | |
| 1 | E0 | Command: | Lexmark Extension | |
| 1 | 11 | Subcommand: | Delete File | Data Field |
| | 0 × 00 | Device specification included in file name | | |
| | 0 × 01 | Disk | | |
| | 0 × 02 | Flash | | |

TABLE #6-continued

| 1 | Unsigned Byte | Length of file name, not including this byte |
| n | ASCII | NULL terminated ASCII representaiion of the file name. |

Printer Response

Command: Lexmark Extension
Subcommand: Delete File

| Byte | Value - Hex | Description | | Notes |
|---|---|---|---|---|
| 1 | A5 | Start of Packet Byte | | Packet Header |
| 2 | 00 04 | Length in Bytes (Does not include these 2 bytes nor the SOP byte) | | |
| 1 | Unsigned Byte | Flag | | |
| 1 | E0 | Command: | Lexmark Extension | |
| 1 | 11 | Subcommand: | Delete File | Data Field |
| 1 | Unsigned Byte | Alert Identification Number, assigned by the printer. | | |

Note: This command is only available in printer specific extension revision level 2 or greater.

Once this delete command has been sent by the host 12, the printer (e.g., printer 16a) will send back a response message having the format as given in the bottom portion of Table #6.

Figure 9:
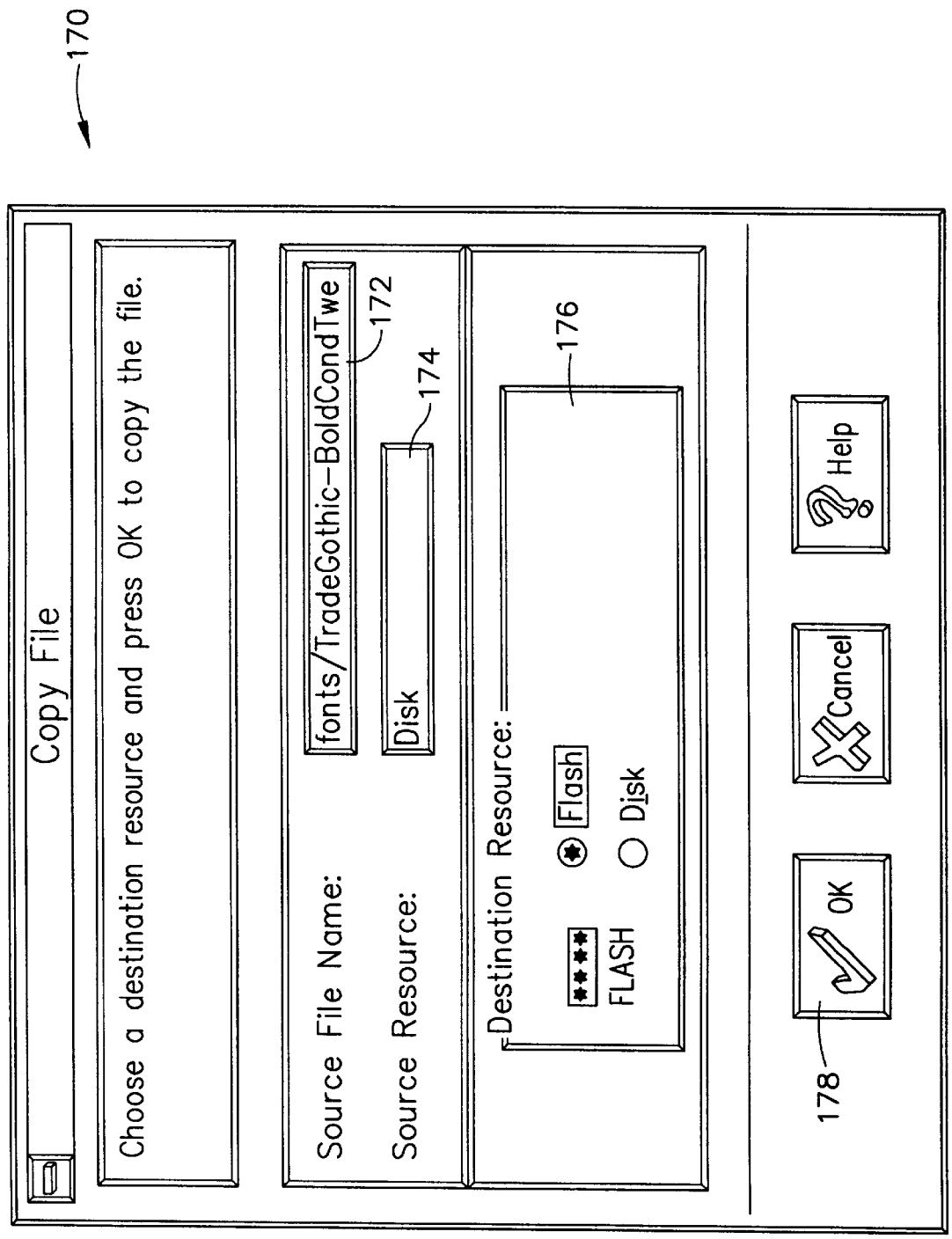
FIG. 9 is a diagrammatic view of one of the display screens of the host computer depicted in FIG. 1, while performing a "copy file" function according to the present invention.

After using the Copy button 72, the monitor screen changes to a "copy file" screen 170, as seen in FIG. 9. Monitor screen 170 provides certain data fields, such as the "source file name" field at 172, the "source resource" at 174, and the "destination resource" that is shown in the field 176. Once the correct data has been entered into these fields, the "OK" button 178 can be used (i.e., clicked on) to initiate the copy file function. The "Cancel" and "Help" buttons are typically used, when needed, just as in many common WINDOWS-type computer programs.

Figure 10:
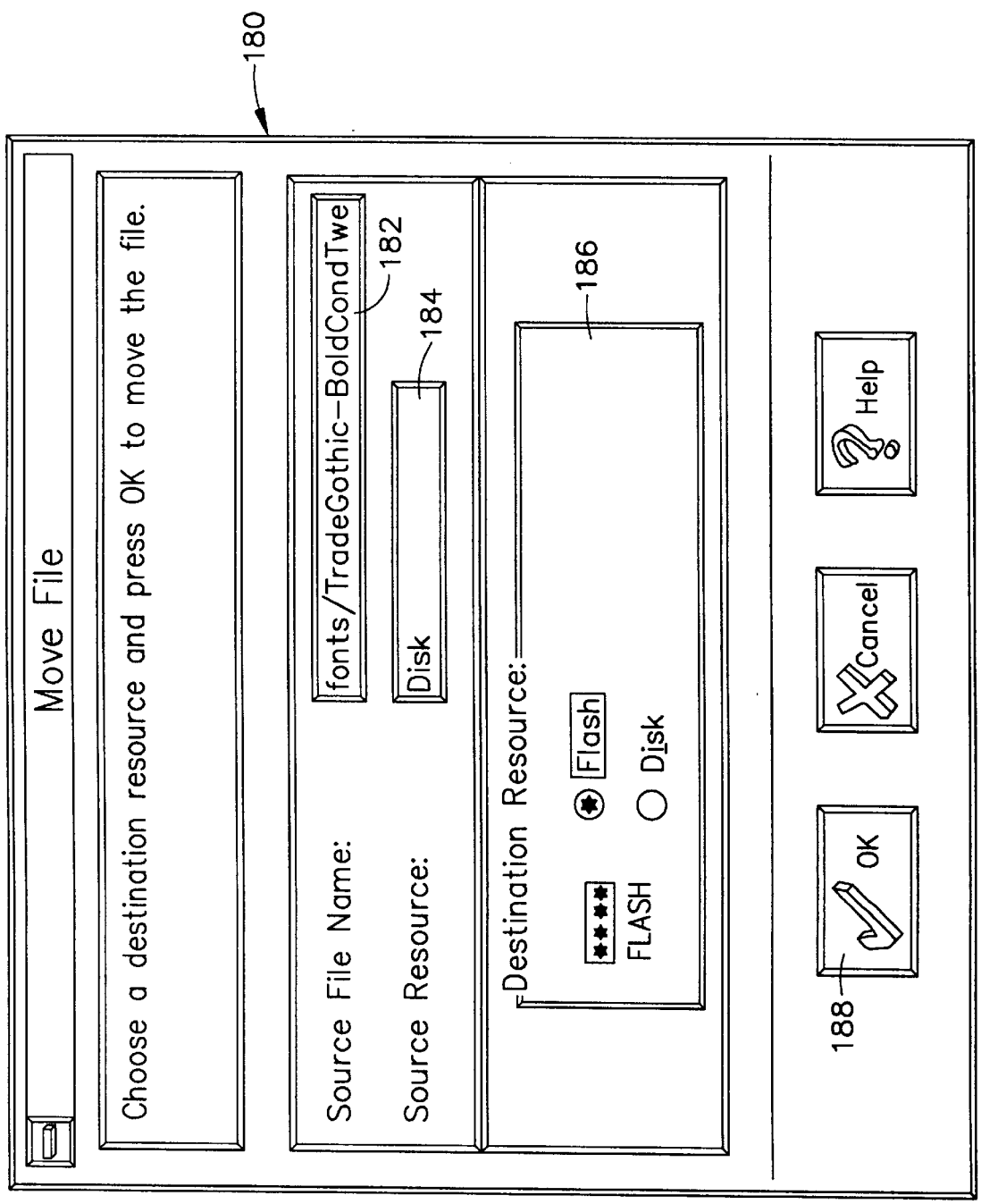
FIG. 10 is a diagrammatic view of one of the display screens of the host computer depicted in FIG. 1, while performing a "move file" function according to the present invention.

The "move file" screen 180 is depicted in FIG. 10. This screen has essentially the same data fields 182, 184, and 186 that are used in the "copy file" screen 170. The move file screen 180 also includes an "OK" button 188, as well as other common WINDOWS-type buttons (i.e., a "Cancel" and "Help" button).

Figure 11:
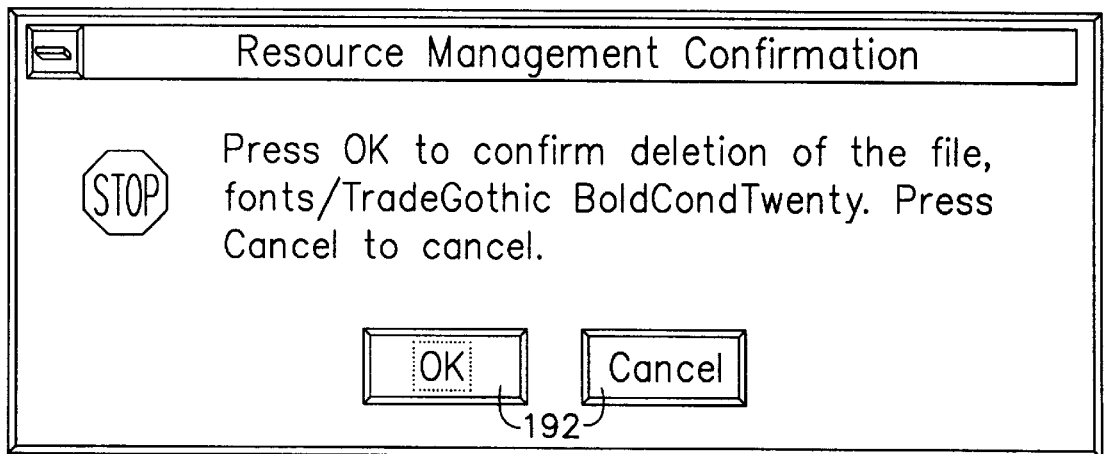
FIG. 11 is a diagrammatic view of one of the display screens of the host computer depicted in FIG. 1, depicting a "confirmation" that a resource management function was successfully accomplished according to the present invention.

After using the Delete button 76, a display screen 190 will appear on the computer monitor, as depicted in FIG. 11. This provides the user/Network Administrator a separate opportunity to cancel the deletion of a particular file in one of the remote printers on the network. As can be seen in FIG. 11, the filename appears in the field of display screen 190, so the user/Network Administrator knows precisely which file will be deleted if the "OK" button 192 is used. Of course, if the user has chosen the wrong file, or changes his mind for any reason, then the Cancel button 192 can instead be chosen.

Figure 12:
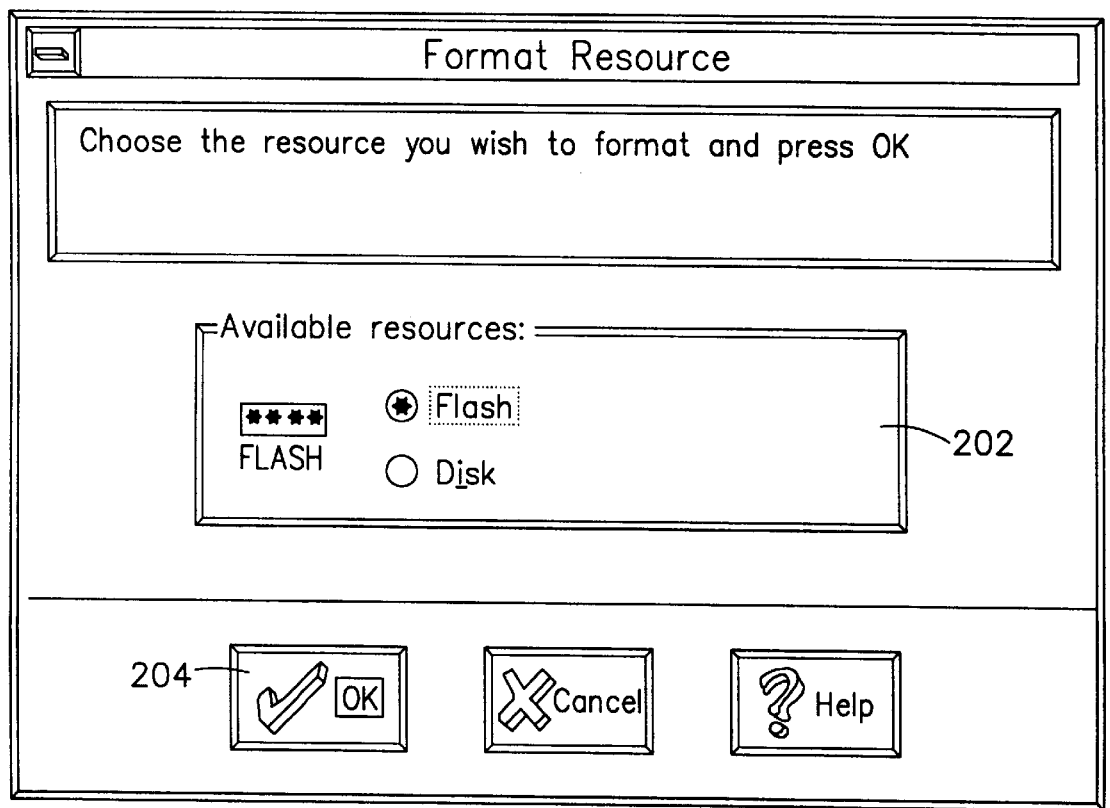
FIG. 12 is a diagrammatic view of one of the display screens of the host computer depicted in FIG. 1, while performing a "format" function of the resource management system according to the present invention.

If the "Format" button 78 is chosen on display screen 70, then that screen will be replaced by another display screen 200 titled "Format Resource," as depicted on FIG. 12. The printer that is to have one of its memory devices formatted is chosen at the "Resource Management" display 70 and, after display screen 200 appears on the computer monitor, the correct memory device is chosen from the field 202. In the example provided in FIG. 12, the available resources (i.e., available memory devices) are the flash RAM or the hard disk drive. An "OK" button 204 is provided for the user/Network Administrator to initiate the formatting procedure of the selected memory device at the selected printer on network 15. Other typical buttons for WINDOWS-type computer programs are also provided, such as a "Cancel" button and a "Help" button.

Figure 14:
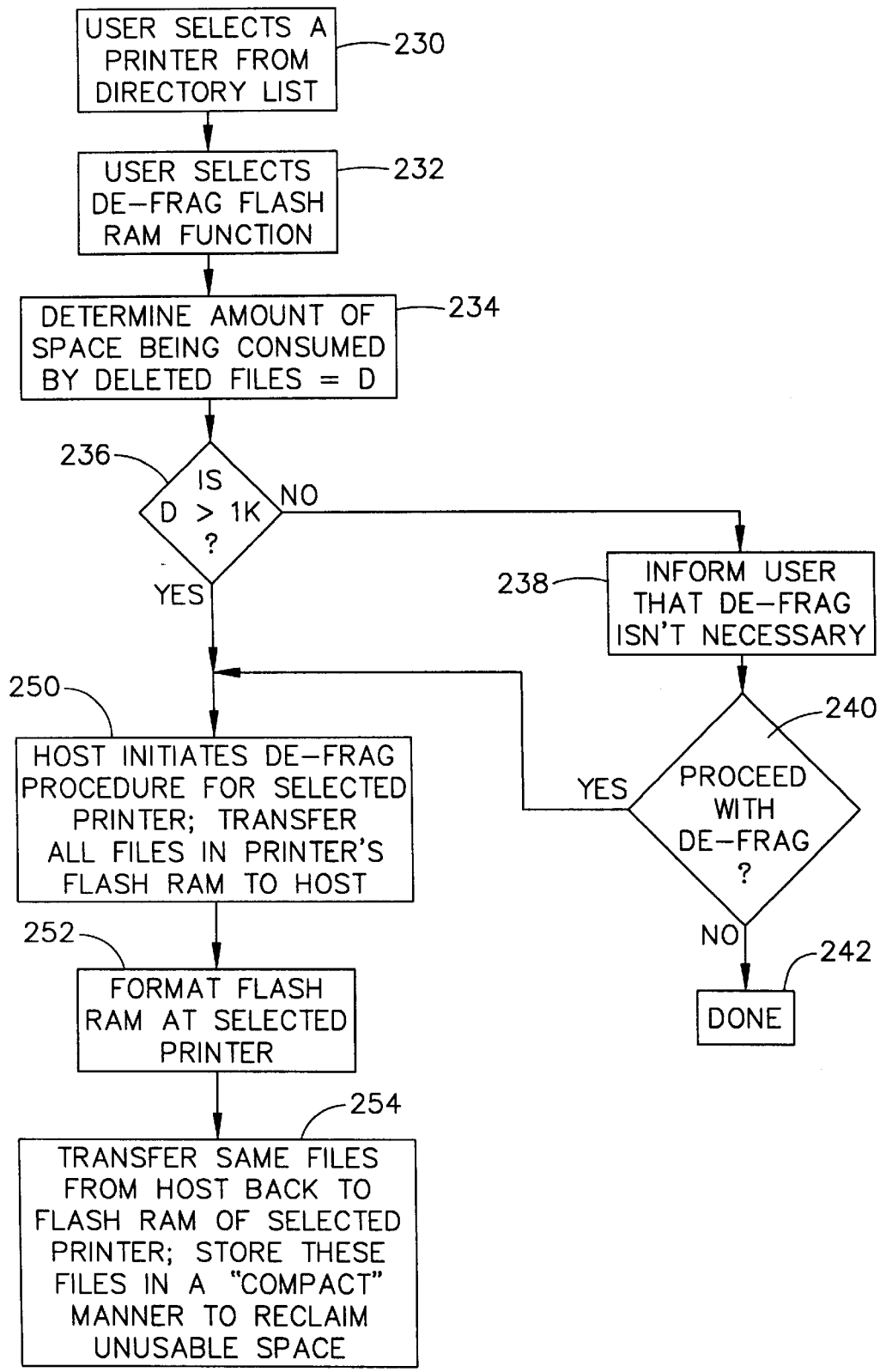
FIG. 14 is a flow chart of the operation of one of the host computers of FIG. 1, depicting the logical steps to perform a "de-fragment flash" command within a particular printer, according to the principles of the present invention.

FIG. 14 depicts a flow chart of the steps that a host computer (e.g., host 12) undergoes to command a printer to de-fragment its flash RAM memory. The user/Network Administrator selects one particular printer (e.g., 16a) that is attached to network 15, according to a function block 230.

The user then selects the "De-fragment Flash" button 84 (see FIG. 8), according to a function block 232. After that has occurred, host 12 and printer 16a transmit information to one another so as to determine whether a defragmentation procedure would be beneficial (or necessary). The printer can determine how much file space is currently being used by "active" files, and also how much "free space" is available in the flash RAM memory to store "new" files. If any files had been earlier deleted (since the last "format" procedure) from the flash RAM, there will exist some "wasted" space in this memory device, since the area of memory that once held a deleted file is typically not "reclaimed" by standard flash RAM devices. The amount of such "wasted" space (="D") is equal to the total capacity of the flash RAM (="A"), minus the space currently used by "active" files (="B") and minus the remaining available "free space" (="C"). In other words, D=(A−B−C), which is calculated at a function block 234.

The "wasted" space D, however, may be a relatively small number, and a de-framentation procedure may not be particularly useful at this time. If the amount of "wasted" space D is less than 1 Kbyte, then it may be assumed that a de-framentation procedure would not be useful; a decision block 236 makes this determination. Naturally, the threshold number for this determination can be other than 1 Kb, either at the designer's discretion, or optionally it can be made into a user-selectable variable. If the result is unfavorable, the user/Network Administrator is informed by a message on the host's monitor screen, controlled by a function block 238, that the de-fragment operation is not necessary.

At a decision block 240, the host asks the user/Network Administrator whether or not to proceed with the defragmentation operation. This question would preferably be in the form of a message at the host's monitor that notifies the user/Network Administrator that, (1) the defragmentation procedure can be time consuming, and (2) that (if true) memory space in the flash RAM will not be saved by invoking the de-fragment command. Decision block 240 thereby provides the user/Network Administrator an opportunity to halt the defragmentation operation. If the question at decision block 240 is answered NO, then the logic flow travels to a "done" function block 242, which effectively halts the defragmentation operation, and redirects the logic flow back to the main program.

If the answer at decision block 240 was YES, then the logic flow is directed to a function block 250, where the host 12 begins a defragmentation procedure at the selected printer. The logic flow also arrives here if the question at decision block 236 was answered YES. At function block 250, all files in this selected printer's flash RAM are transferred, one-by-one, to the host 12 via network 15. After that has been accomplished, the flash RAM of the selected printer will undergo a "format" operation (at a function block 252) to erase all data in the flash RAM device. The host, at a function block 254, now transfers these same files back to the selected printer, one-by-one. As these files are serially received by the selected printer, the files are stored in the same flash RAM, however, they are stored in a "compacted" manner. This will save memory space in the flash RAM, and may also provide a quicker access time to a file in the flash RAM. This "cleansing" of the flash RAM is important, since the memory space of typical flash RAM devices is not reclaimed when a file is deleted. The defragmentation operation not only reclaims memory space that would otherwise go unused, but also compacts those remaining files into a logical sequence in the physical memory locations of the flash RAM device.

Function block 250 will cause the files to be read from the printer into the host, which is achieved automatically using a "directory listing" and the "read file" command. Information is taken from the directory listing to find the file name of each file stored in the flash RAM memory device. When the read file command is used to request a portion of the specified file, the selected printer immediately responds to inform the host that the read file request was either accepted or rejected. Assuming that the command was accepted, the selected printer will send a "Flash/Disk alert" which contains the requested data block. This information is stored in a temporary file, and the next block of the file is requested. This process is repeated until the entire file has been read and the data stored on the host 12.

When all flash RAM files have been stored at the host 12, a "Format Device" request is sent to the selected printer (see function block 252). When the format has been successfully completed, the files will be returned to the flash RAM of the (same) selected printer. This is achieved by using the "write file" command, according to function block 254. Data blocks are read from the temporary files at the host 12, and sent to the selected printer using the "write file" NPAP command. When this command is sent, the selected printer immediately responds to inform the host that the write file request was either accepted or rejected. Assuming that the write file command was accepted, the selected printer will send a "Flash/Disk alert" which verifies that the data block was successfully written to the flash RAM. This writing process continues until all of the files have been restored to the flash RAM memory device.

When a Format Device request is sent to a printer from a host, a command will be sent from the host to one of the printers on the network 15, and this message will have a format as provided in Table #7, below:

TABLE #7

5-6-4 Format Device

Host Command

| Byte | Value - Hex | Description | | Notes |
|---|---|---|---|---|
| | | Command: | Lexmark Extension | |
| | | Subcommand: | Format Device | |
| 1 | A5 | Start of Packet Byte | | Packet Header |
| 2 | Unsigned Word | Length in Bytes (Does not include these 2 bytes nor the SOP byte) | | |
| 1 | Unsigned Byte | Flag | | |
| 1 | E0 | Command: | Lexmark Extension | |
| 1 | 13 | Subcommand: | Format Device | Data Field |
| 1 | 0 × 00 | Device specification included in the name field | | |
| | 0 × 01 | Disk | | |
| | 0 × 02 | Flash | | |
| 1 | Unsigned Byte | Length of name, not including this byte | | |
| n | ASCII | NULL terminated ASCII representation of the device. | | |

Printer Response

| Byte | Value - Hex | Description | | Notes |
|---|---|---|---|---|
| | | Command: | Lexmark Extension | |
| | | Subcommand: | Format Device | |
| 1 | A5 | Start of Packet Byte | | Packet Header |
| 2 | 00 04 | Length in Bytes (Does not include these 2 bytes nor the SOP byte) | | |
| 1 | Unsigned Byte | Flag | | |
| 1 | E0 | Command: | Lexmark Extension | |
| 1 | 13 | Subcommand: | Format Device | Data Field |
| 1 | Unsigned Byte | Alert Identification Number, assigned by the printer. | | |

Note: This command is only available in printer specific extension revision level 2 or greater.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method for copying print job information residing on a first printer to a second printer, via a network, under control of a host computer that issues a file transfer command, said method comprising the steps of:

(a) reading a data set of print job information residing in a first memory device of said first printer, said first printer having bi-directional communications capability;

(b) transmitting said data set via a first communications port of said first printer to said network;

(c) receiving said data set via a second communications port of said host computer from said network, and storing said data set in a second memory residing on said host computer;

(d) transmitting said data set via said second communications port of said host computer to said network; and (f) receiving said data set from said network via a third communications port on said second printer, said second printer then writing said data set into a third memory device, said data set now residing in said third memory device being identical in content to said print job information that was originally residing in said first memory device.

2. The method as recited in claim 1, further comprising the steps of: (g) receiving said data set from said network via a fourth communications port on a third printer, said third printer then writing said data set into a fourth memory device, said data set now residing in said fourth memory device being identical in content to said print job information that was originally residing in said first memory device.

3. The method as recited in claim 1, wherein the step of receiving said data set at said second printer further includes NPAP processing by a Network Printing Alliance Protocol processing circuit capable of receiving and transmitting information that conforms to the Network Printing Alliance Protocol.

4. The method as recited in claim 1, further comprising the steps of: (g) providing a multitasking first processing circuit at said first printer; and (h) interpreting and supplying the print job information to a first print engine at said first printer, while virtually simultaneously executing said file transfer command by causing said data set to be (1) read from said first memory device, then (2) transferred to said first communications port, where said data set is transmitted to the network.

5. The method as recited in claim 1, further comprising the steps of: (g) providing a multitasking second processing circuit at said second printer; and (h) interpreting and supplying the print job information to a second print engine at said second printer, while virtually simultaneously executing said file transfer command by causing said data set to be (1) written into said third memory device, after (2) having been transferred from said third communications port, where said data set is received from the network.

6. A method for de-fragmenting print job information residing on a printer, via a network, under control of a host computer that issues a defragmentation command, said method comprising the steps of:

(a) reading a data set of print job information residing in a first memory device of said printer, said printer having bi-directional communications capability;

(b) transmitting said data set via a first communications port of said printer to said network;

(c) receiving said data set via a second communications port of said host computer from said network, and storing said data set in a second memory residing on said host computer;

(d) transmitting a format command from said second communications port of said host computer to said printer, via said network;

(e) receiving said format command at said printer via said first communications port, via said network, and formatting said first memory device;

(d) transmitting said data set via said second communications port of said host computer to said network; and (f) receiving said data set from said network via said first communications port of said printer, said printer then writing said data set into said first memory device, said data set now residing in said first memory device being identical in content to said print job information that was originally residing in said first memory device.

7. The method as recited in claim 6, wherein said data set comprises a plurality of print job data files, and said first memory device comprises a flash RAM memory device.

8. The method as recited in claim 6, wherein said data set, at the step (f) of said method, is compacted.

* * * * *